United States Patent [19]
Sprague et al.

[11] Patent Number: 4,740,832
[45] Date of Patent: Apr. 26, 1988

[54] IMAGE STORAGE USING SEPARATELY SCANNED LUMINANCE AND CHROMINANCE VARIABLES

[75] Inventors: David L. Sprague, Hopewell; Nicola J. Fedele, Kingston; Lawrence D. Ryan, Princeton Junction, all of N.J.

[73] Assignee: Technology, Inc., 64, Princeton, N.J.

[21] Appl. No.: 918,275

[22] Filed: Oct. 14, 1986

[51] Int. Cl.⁴ .............................................. H04N 9/00
[52] U.S. Cl. .................................. 358/21 R; 340/703; 340/798; 358/13
[58] Field of Search .................. 358/12, 13, 14, 21 R, 358/310; 340/703, 798, 799

[56] References Cited

U.S. PATENT DOCUMENTS

| | | | |
|---|---|---|---|
| 4,206,457 | 6/1980 | Weisbecker et al. | 340/703 |
| 4,210,927 | 7/1980 | Yumde et al. | 358/12 |
| 4,415,918 | 11/1983 | Lewis, Jr. | 358/23 |
| 4,520,386 | 5/1985 | Asaida | 358/13 |
| 4,553,175 | 11/1985 | Baumeister | 358/310 |
| 4,564,915 | 1/1986 | Evans et al. | 364/521 |
| 4,625,230 | 11/1986 | Tan et al. | 358/13 |
| 4,633,295 | 12/1986 | van de Polder et al. | 358/12 |
| 4,646,151 | 2/1987 | Welles, II et al. | 358/149 |

FOREIGN PATENT DOCUMENTS 70718  6/1978  Japan ...................................... 358/12

*Primary Examiner*—John W. Shepperd
*Attorney, Agent, or Firm*—E. M. Whitacre; P. J. Rasmussen; E. P. Herrmann

[57] ABSTRACT

Computer main memory is used for storing relatively densely sampled luminance information concerning a television display and for storing relatively sparsely sampled chrominance information concerning the same television display. The relatively densely sampled luminance information is read out in substantially real-time from computer main memory during line trace intervals in the television display. The relatively sparsely sampled chrominance information is read out of computer main memory in advanced and compressed time during selected line retrace intervals in the television display.

19 Claims, 14 Drawing Sheets

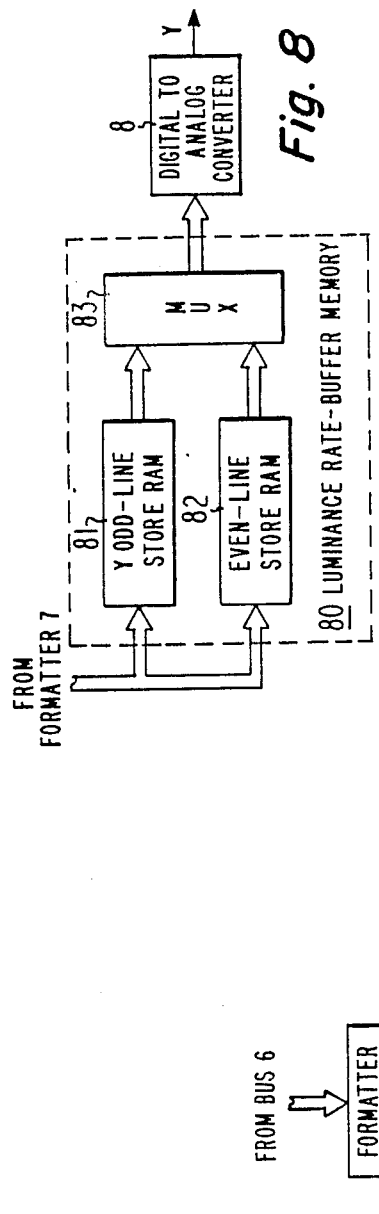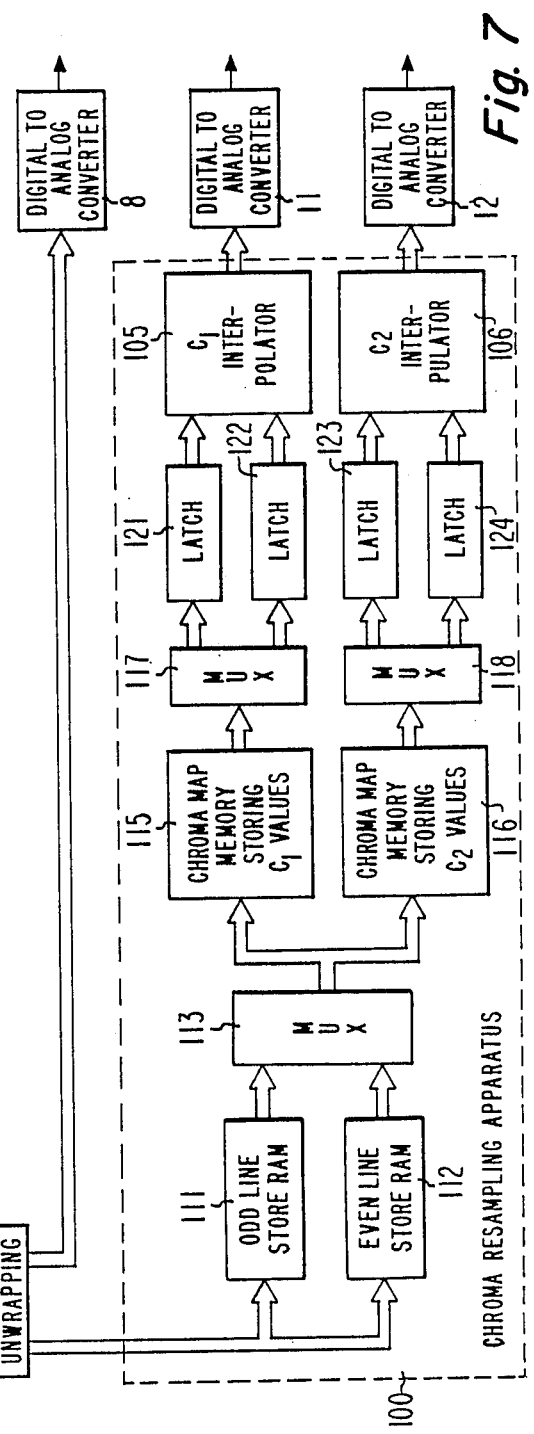

Fig. 14

IMAGE STORAGE USING SEPARATELY SCANNED LUMINANCE AND CHROMINANCE VARIABLES

The invention relates to image storage in television display systems as may, by way of example, be used in computer apparatus.

BACKGROUND OF THE INVENTION

A small computer may be used to decode television display material that has been encoded in an economical format (e.g., to permit the transmission of image data via telephone lines or the recording of image data on compact disc). This small computer may be provided with general-purpose memory, portions of which are available for use as image memory to provide buffering between an irregular flow of received image data and the regular flow of image data to the display. It is desirable to provide an image memory configuration that is well suited to being used interchangeably with other data storage in general-purpose memory and does not require the use of dedicated portions of the memory for image storage.

The encoding of television information for transmission over media of such limited bandwidths as those available from a telephone line or compact disc forces the designer to resort to powerful video compression methods. These methods rely upon transmitting as little new image information per frame as possible and upon storing as much old image information as possible; and transmission of new image information cannot be done, at least not entirely, in real time. In order to write a display in real time, then, it is essential then to have frame buffer storage memory with the capability of storing at least two frames of video information. Such memory can be written to from a flow of compressed image data received in non-real time and read from so as to supply the display apparatus with a regular flow of image data in real time. The frame buffer storage memory is bit-map-organized for convenience in constructing updated images from previous image data in accordance with instructions included in the compressed video data.

In present-day practical terms such a frame buffer storage memory is a large amount of memory. Sampling chrominance information more sparsely in space than luminance information can substantially decrease the amount of information to be stored. E.g., where chrominance is sampled one quarter as densely as luminance in the directions of line trace and of line advance, a sixteen times reduction in the amount of chrominance information to be encoded results. If chrominance is described in terms of two orthogonal color-difference signals each having the same number of bits resolution as luminance, which is commonly the case, the amount of chrominance information to be stored in the frame buffer storage memory is reduced from twice the amount of luminance information to be encoded to only one-eighth the amount of luminance information to be encoded.

Image memories, the addressable storage locations of which map corresponding picture elements or "pixels" on a display screen and which store single bits descriptive of whether those corresponding pixels are bright or dark, have been described as being "bit-map-organized" for many years. In recent years the term "bit-map-organized" has been applied to certain image memories in which a pixel variable related to brightness is not expressed in terms of a single bit, but rather in terms of a plurality of bits. Such brightness-related variables may be luminance variables or may be color-difference variables used in connection with describing color displays, for example. The term "bit-map-organized" has been extended to refer to two different memory configurations, each storing a plural-bit value descriptive of a pixel variable.

A plural-bit-variable bit-map-organized image memory of a first general type known in the prior art can be thought of as having employing a number of planes, which number equals the total number of bits in the plural-bit-variable(s) describing a single pixel. The most significant bits of a first of the pixel variables are stored in the first bit plane at storage locations having respective addresses mapping respective pixel locations in the display; the next most significant bits of the first pixel variable are stored in the second bit plane at storage locations having respective addresses mapping respective pixel locations in the display in a manner corresponding to the mapping of the storage locations in the first bit plane; and so forth, proceeding to less significant bits in the first pixel variable, then proceeding through the bits of each other pixel variable (if any) proceeding from most significant to least significant bit. Responsive to a single address this type of memory furnishes simultaneously the respective plural bits of all the pixel variables descriptive of a particular pixel. Essentially, the spatial positions of individual pixels in the display have a one-to-one correspondence with respective image memory addresses, in a spatial mapping. This spatial mapping is held together by the tracing of the display screen and scanning of image memory addresses each being done in accordance with a prescribed pattern of correspondence between these activities. So long as the pattern of correspondence between these activities is adhered to, the rate at which and order in which these activities are carried out do not affect the spatial mapping between the image memory addresses and the spatial positions of display pixels.

A second general type of plural-bit-variable bit-map-organized image memory known to the prior art does not require a one-to-one correspondence between image memory address and the spatial positions of display pixels. There is a list of the values of the plural-bit pixel variables in a prescribed cyclic order, which cycles are arranged in the sequence of the tracing of the spatial positions of pixels in the display. The list is converted to a string of values of the pixel variables, with the bits in each value arranged in prescribed order according to relative significance. Each string of values is divided into words of given bit length, which words are stored respectively in successively addressed locations in the image memory. An image memory of this second general type has to be read out to a formatter with pixel unwrapping capability. The formatter reconstitutes the words into a string of values which are then parsed back into successive values of each pixel variable. The variables for each pixel are temporally aligned by the formatter to be available at the time the spatial position of that pixel is reached in the scanning of the display screen.

When a pixel is described in terms of plural variables--e.g., a luminance variable and two chrominance variables--it has been a general practice to group these variables in a prescribed order for each pixel and to use each group as subvariable components of a respective value of a complex pixel-descriptive variable, when the second general type of bit-map organization is employed in image memory applications. The values of this complex variable are then stored in a bit-map-organized image memory organized as either the first or the second type of image memory described above. This practice is reasonably satisfactory as long as the pixel-descriptive variables used as subvariable components of the complex variable are sampled at corresponding points in display space and with the same sampling density. However, it is desirable to be able to sample the pixel variables at differing sampling densities in order to conserve image memory and to permit faster image processing. Then, this method of using complex pixel-descriptive variables becomes unattractive.

J. A. Weisbecker and P. K. Baltzer in U.S. Pat. No. 4,206,457 issued June 3, 1980 and entitled "COLOR DISPLAY USING AUXILIARY MEMORY FOR COLO INFORMATION" describe an image memory comprising a luminance-only memory, the read addresses of which map display space according to a densely sampled bit-map organization, and a chrominance-only memory, the read addresses of which map display space according to a sparsely sampled bit-map organization. Separate memories, which they refer to as "data memory" and as "small auxiliary memory", are dedicated to the storage respectively of luminance-only information and of chrominance-only information. The read addresses for the auxiliary memory are the more significant bits of the read addresses for the data memory in a scheme for accessing the memories in parallel during reading out from image memory. The Weisbecker and Baltzer configuration of image memory is a variant of the first general type of plural-bit-variable bit-map-organized memory, it is pointed out.

The Weisbecker and Baltzer memory architecture dedicates specific portions of a combined image memory to luminance and dedicates other specific portions to chrominance. Video image storage systems are known where chrominance subsampled respective to luminance for storage in digital memory is spatially interpolated to generate re-sampled chrominance of the same sampling density as luminance, with similar-sample-rate luminance and chrominance signals being linearly combined to generate component-primary-color signals (i.e., red, green and blue signals). Not only can linear interpolation in the direction of scan line extension be used. Bilinear interpolation, where there is linear interpolation both in this direction and in the direction transverse to scan lines, can also be used, for example.

Because of the desire to reduce storage requirements for image memory, which can be accomplished without immediately perceptible degradation of the displayed image by sampling chrominance less densely than luminance, particularly if the image is camera-originated, there is a strong impetus for the designer to configure image memory along the lines suggested by Weisbecker and Baltzer. However, in the Weisbecker and Baltzer configuration of image memory, the number of pixel-descriptive bits associated with an image memory address changes, depending on whether or not a spatial position in the display does or does not have a chrominance value as well as a luminance value associated with it. This interferes with the shifting of bit-map-organized image information in the image memory unless the memory is allowed to have unused bits of storage in it. This, however, undesirably negates to some degree the advantage of sampling chrominance more sparsely in space than luminance. The ability to shift image portions readily in image memory is important in the reconstruction of dynamic images in image memory responsive to compressed video data.

The inventors find it is also unattractive to use complex pixel-descriptive variables in variants of the second general type of plural-bit-variable bit-map-organized memory that subsample chrominance as compared to luminance. The complex pixel-descriptive variables are intermixed with luminance-only pixel descriptive variables in the image memory read out. This presents complex data-parsing problems, especially when shifting of image portions in memory takes place in the decoding of compressed video data.

A type of dual-ported, dynamic random-access memory that has recently become commercially available is the so called "video random-access memory" or "VRAM". This dynamic memory, in addition to a random-access input/output port through which information can be written into or read out of the memory, has a serial-access port from which a row of data can be read serially at video scan rates. The row busses of a principal dynamic random-access memory portion of a VRAM are arranged to transfer data in parallel to a smaller auxiliary memory of the VRAM, during an interval equal to the read interval from the random-access port. A counter is provided in each VRAM for scanning the addresses of the auxiliary memory during its reading, so the auxiliary memory can function as a shift register. After parallel loading of the auxiliary memory, its contents are read out serially through the VRAM serial output port, with the counter counting at a relatively high clock rate. This clock rate can be the rate at which the luminance-only picture elements are delivered to the display monitor of the computer apparatus, for example. This speed of reading is possible because the capacitance-to-substrate of the auxiliary memory busses is relatively low owing to the smaller size of this auxiliary memory. It is attractive, then, the present inventors point out, to use VRAM for the general-purpose memory capable of storing television images, with both the luminance-only information and the chrominance-only information being read out through the serial output port on a time-division-multiplexed basis, although conventional random-access memory can also be used.

In some types of VRAM data can also be serially read into the auxiliary memory via the serial-access port, to be transferred in parallel into the principal dynamic random-access portion of the VRAM. This allows faster writing of the VRAM than is possible by writing information via its random-access port.

Television transmission systems are known where, in order to avoid chrominance information in an analog signal cross-talking with luminance information in an analog signal, lines of chrominance information are time-compressed and are time-interleaved between lines of luminance information. The time compression and time displacement of chrominance is carried out in the digital domain, then transformed to the analog domain by digital-to-analog conversion. These systems are known as "Multiplex Analog Component" transmission systems or "MAC" transmission systems. Luminance/chrominance crosstalk is not a problem in digital television transmission systems such as those considered herein, where luminance samples and chrominance samples are kept separate from each other.

The present inventors discerned that time interleaving of lines of digitized chrominance information with lines of digitized luminance information is usefully applied to the reading of VRAM through its serial access port, in that it permits the use of separate bit-map organizations for luminance and chrominance variables in VRAM. The use of separate bit-map organizations for luminance and chrominance variables the present inventors perceived would avoid the problems encountered in the use of complex pixel-descriptive variables in a unified bit-map organization when chrominance is sampled less densely in display space than luminance is. The use of separate bit-map organizations can be accommodated by using a rate-buffering memory for at least the chrominance samples, the present inventors realized.

In television receivers processing conventional alternate-field line-interlaced television signals to provide progressive scan at doubled horizontal scan rates, a rate-buffering memory is used to receive and delay expanded information, both for luminance and for chrominance. This rate-buffering memory is used for a further purpose, as well, to provide the sample bed information to support spatial interpolation in the direction transverse to line scan. For example, W. N. Hartmeier describes such apparatus in U.S. Pat. No. 4,580,163 issued Apr. 1, 1986 and entitled "PROGRESSIVE SCAN VIDEO PROCESSOR HAVING PARALLEL ORGANIZED MEMORIES AND A SINGLE AVERAGING CIRCUIT". Three line storage memories are operated on a cyclic write-one, read-two basis to provide spatial interpolation in the direction transverse to the line scan. The present inventors developed simpler structures using only two line storage memories for providing rate-buffering and spatial interpolation following VRAM read-out in television display systems of the type with which they are concerned.

SUMMARY OF THE INVENTION

Time-division-multiplexing of lines of luminance-only information and lines of chrominance-only information in the reading out of VRAM used as image memory is done in image memory systems constructed in accordance with the invention. This allows separate bit-map organizations in image memory of luminance-only and chrominance-ony information; and it facilitates the luminance-only information and chrominance-only information both passing through the VRAM serial output port, while avoiding complicated parsing of VRAM serial output data into luminance-only and chrominance-only portions. Provisions for such parsing would be complicated where chrominance information is spatially sampled less densely than luminance information in the descriptions of the displayed images, which as indicated above is highly desirable for conserving image memory. Provisions for such parsing into luminance-only and chrominance-only portions would be especially complicated where images are apt to be stored in a variety of luminance/chrominance formats.

Luminance-only information is read out from VRAM image memory in real time at the video scan rate, during the display line trace intervals, without need for rate buffering in preferred embodiments of the invention. Alternatively, luminance-only information may be rate-buffered between the VRAM image memory and the display. Chrominance-only information is read out in compressed and displaced time, preferably during the display line retrace intervals. Rate-buffering and spatial interpolation are then used to place the chrominance-only information into proper temporal relationship vis-a-vis the luminance-only information with which it is combined for generating drive signals for the display apparatus.

A further aspect of the invention is simplified structure for performing the rate-buffering and spatial interpolation of the chrominance-only information. In the present invention the VRAM supplies to rate-buffering memory chrominance-only data that is compressed in time, rather than expanded in time, as compared to the response to that chrominance data as it appears on screen. This allows spatial interpolation to be supported with a rate-buffering memory that is more economical of parts than prior-art spatial interpolators. Two line-storage memories suffice to provide spatial interpolation in the direction transverse to line scan when a $2 \times 2$ bed of samples is used in bilinear interpolation, for example. Alternate ones of successive scan lines of chrominance-only data in a field scan are successively written into the first line storage memory during display line retrace intervals or during selected ones of those intervals; and the other remaining scan lines of chrominance-only data in that field scan are successively written into the second line storage memory. These two line storage memories are read out during display line trace intervals. The read outs are permuted, weighted and linearly combined to complete spatial interpolation in at least the direction of line scan.

A still further aspect of the invention is the configuring of the VRAM using separate bit-map organizations of luminance-only and of chrominance-only information, to implement the time-division-multiplexing of lines of luminance-only information and chrominance-only information.

BRIEF DESCRIPTION OF THE DRAWING

FIG. 7 is a schematic diagram of alternative chroma resampling apparatus to replace that shown in FIG. 1.

FIG. 8 is a schematic diagram of a modification that can be made to either the FIG. 1 or the FIG. 7 television display system, to provide for rate-buffering of luminance information read out of VRAM in further embodiments of the invention.

FIGS. 9-16 are diagrams of how VRAM rows can be packed with image data in accordance with the invention.

DETAILED DESCRIPTION OF THE PREFERRED EMBODIMENT

Figure 1:
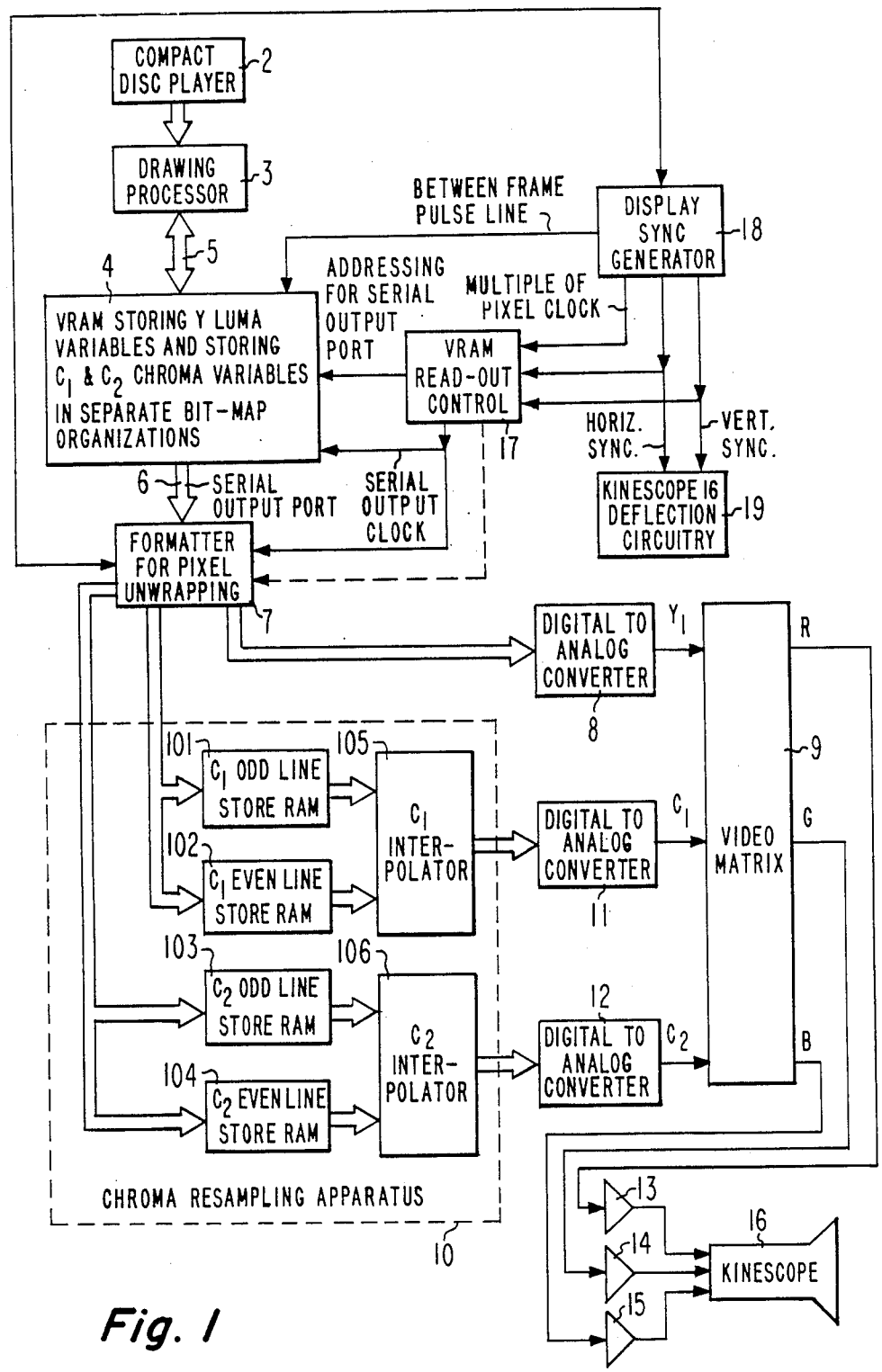
FIG. 1 is a schematic diagram of a television display system which includes chroma resampling apparatus and embodies the invention.

FIG. 1 shows a television display system which converts television imagery, stored in compressed form on a compact disc, to a real-time display. A compact disc player 2 supplies the television imagery in coded form to a drawing processor 3. (Another data source, such as a Winchester disc, may be used instead of compact disc player 2.) The imagery coding is designed to describe differences of a current image from recent images already reconstructed and stored in the image memory portions of a video random-access memory (or VRAM) 4, to lessen redundancy in the imagery coding. (VRAM 4, as will be explained in detail further on, is in actuality a banked array of component monolithic VRAMs.) Drawing processor 3 has a bus connection to the read/write random-access port of VRAM 4 and to VRAM 4 control circuitry that allows drawing processor 3 to read out to itself any of the images stored in VRAM 4 and that allows drawing processor 3 to write a current or updated image into the image memory portion of VRAM 4. VRAM 4, in addition to its random-access input/output port, has a serial output port from which a row of data can be read serially at video rates.

The nature of the stored images in VRAM 4 is of particular concern to the invention. The image memory portions of VRAM 4 are separately bit-map-organized with respect to luminance samples and with respect to chrominance samples. In a bit-map organization of image memory, the storage locations in memory conformally map descriptions of the picture elements, or "pixels", of the display subsequently constructed from the read-out of that image memory. One can arrange to bit-map pixels so luminance and chrominance samples are combined at each storage location in image memory. However, sometimes luminance samples are more densely packed in space than chrominance samples are. Furthermore, sometimes the ratio of the sampling densities in space of luminance samples and of chrominance samples is subject to variation. To include chrominance samples together with only selected luminance samples in a single bit-map organization would tend to result in underutilization of memory at such times. This is because, practically speaking, each storage location would have to have the capability of storing chrominance information whether or not it was actually available for that point in the bit-map.

The inventors avoid this problem by using densely-sampled-in-space bit-map organization for luminance samples in one portion of image memory and using a separate sparsely-sampled-in-space bit-map organization for chrominance samples in another portion of image memory. It is convenient to make the sparser spatial sampling a subsampling of the denser spatial sampling. Where the ratio of the spatial sampling densities varies, the apportionment of image memory between luminance samples and chrominance samples changes.

During line trace intervals in the display, lines of luminance samples from the more densely sampled bit-map-organized portions of image memory that have been loaded in parallel into the VRAM 4 auxiliary memory are read out serially through the serial output port 6 of VRAM 4 to a formatter 7. Formatter 7 performs "pixel-unwrapping" functions to furnish pixel data concerning either luminance or chrominance. The way formatter 7 operates will be described in more detail further on. During line trace intervals formatter 7 re-times the luminance samples (supposing them to have been "linearly packed" in VRAM 4, as will be described in greater detail further on) so they are supplied at pixel scan rate to a digital-to-analog converter 8. Converter 8 supplies to video matrixing circuitry 9 a continuous analog response to these luminance samples.

During selected line retrace intervals in the display, lines of samples of first and second chrominance variables $C_1$ and $C_2$ from the less densely sampled bit-map-organized portions of image memory are selected for read out from VRAM 4 via serial access output port 6 to formatter 7. A preferred way to do this is to read out a line of $C_1$ samples followed by a line of $C_2$ samples during each selected line retrace interval. This permits separate bit-map organizations for $C_1$ and $C_2$, which simplifies the drawing processor 3 required for converting coded imagery from compact disc player 3 to bit-map organization image data in VRAM 4. Simplification arises because calculations involving $C_1$ and $C_2$ can be performed separately and serially, such calculations being made with simpler interfacing between drawing processor 3 and VRAM 4. The time-division-multiplexing of Y, $C_1$ and $C_2$ output signals from formatter 7 to a chroma resampling apparatus 10 during display processing is also simplified, since the multiplexing rate during line retrace intervals is low.

Formatter 7 performs further pixel-unwrapping functions, in separating successive $C_1$ and $C_2$ samples and supplying separate bit streams of $C_1$ samples and of $C_2$ samples to the chrominance resampling apparatus 10. If VRAM image memory is read out in the preferred way, a bit stream of $C_1$ samples is supplied to chrominance resampling apparatus 10, followed by a stream of $C_2$ samples. The chrominance re-sampling apparatus 10 re-samples the digitized $C_1$ and $C_2$ variables to the same sampling density as the digitized luminance, Y. The $C_1$ samples are supplied to a digital-to-analog converter 11, which supplies its analog $C_1$ response to video matrixing circuitry 9. The $C_2$ samples are supplied to a digital-to-analog converter 12, which supplies its analog $C_2$ response to video matrixing circuitry 9. The chrominance resampling apparatus includes time delay apparatus. The delay apparatus brings the $C_1$ and $C_2$ samples supplied to digital-to-analog converters 11 and 12 into proper alignment-in-time with the Y samples supplied to digital-to-analog converter 8. This allows the Y and $C_1$ and $C_2$ signals to be matrixed together to generate red (R) and green (G) and blue (B) drive signals. These R, G and B drive signals are amplified by video amplifiers 13, 14 and 15 respectively. The amplified drive signals are then applied to kinescope 16 to generate the color display.

Still referring to FIG. 1, a display synchronizing generator 18 generates HORIZONTAL SYNCHRONIZATION and VERTICAL SYNCHRONIZATION pulses for application to the deflection circuitry 19 of kinescope 16. Display synchronizing generator 18 also supplies signals to VRAM read-out control circuitry 17 to inform it concerning display timing. For example, VRAM read-out control circuitry 17 includes a line counter for counting HORIZONTAL SYNCHRONIZATION pulses supplied from display synchronizing generator 18. This line counter is reset to zero by a BETWEEN FRAME pulse supplied by display synchronizing generator 18 after the conclusion of each frame of display and before the start of the next. Display sync generator 18 also supplies pulses at a multiple of the pixel scan rate to control circuitry 17. Circuitry 17 scales from these pulses to generate an appropriate SERIAL OUTPUT CLOCK signal for application to VRAM 4 and to formatter 7.

The formatter 7 allows data to be taken out "full width" from the serial output port 6 of VRAM 4, so the clock rate at which data is clocked from port 6 can be kept to a minimum. For example, if port 6 is thirty-two bits wide, then during the line trace interval, each 32-bit word read out through port 6 can be apportioned into four successive eight-bit luminance samples by formatter 7, permitting the VRAM output to be scanned at one-quarter of the pixel scan rate. Formatter 7 does this formatting responsive to instructions from control circuitry 17. Control circuitry 17 also selects the rows in VRAM 4 to be transferred in parallel to the VRAM 4 shift register shifting its contents out through serial-access output port 6. VRAM read-out control circuitry 17 also applies the correct SERIAL OUTPUT CLOCK signal to this shift register for this shifting procedure.

Continuing the example, suppose the chrominance samples $C_1$ and $C_2$ are all eight-bit samples and are spatially subsampled every fourth luminance sample in every fourth line of luminance samples. During a selected line retrace interval, conventionally one fifth as long in duration as a line trace interval, the number of samples in $C_1$ and the number of samples in $C_2$ each is one-quarter the number of samples of the luminance signal Y during a line trace. Each thirty-two-bit word read out through port 6 during a line retrace interval is apportioned into four successive eight-bit $C_1$ samples or four successive eight-bit $C_2$ samples, for application to chrominance resampling apparatus 10. Since the number of samples of $C_1$ per one of its scan lines and the number of samples of $C_2$ per one of its scan lines are each one-quarter the number of samples of luminance per one of its scan lines, the total number of samples of chrominance per one of its scan lines is one half the number of luminance samples per one of its scan lines. Since the total number of samples of chrominance per one of its scan lines is to be transferred from VRAM 4 serial output port 6 in a line retrace interval one fifth the duration of the line trace interval in which luminance samples are displayed, VRAM read out control circuitry 17 has to increase the SERIAL OUTPUT CLOCK rate during line retrace by a factor of at least 2½ times.

If clock rates are scaled only by powers of two from a high rate master clock signal, the serial clock rate used to read from VRAM 4 during line retrace interval will be four times the pixel scan rate for luminance. This reduces the time needed for accessing VRAM 4 for obtaining chrominance samples to less than a complete line retrace interval, freeing output port 6 for downloading other data during the remaining portion of the line retrace interval.

The chrominance resampling apparatus 10 includes line-storage random-access memories 101, 102, 103 and 104. A selected pair of these line-storage memories are written responsive to $C_1$ samples and $C_2$ samples supplied to them respectively from formatter 7 during selected line retrace intervals. Line-storage memories 101 and 102 are written alternately by successively selected lines of $C_1$ samples, and memories 101 and 102 are read out during line trace intervals to supply adjacent lines of $C_1$ samples in parallel to a two-dimensional spatial interpolator 105. Line-storage memories 103 and 104 are written alternately by successively selected lines of $C_2$ samples. Memories 103 and 104 are read out during line trace intervals to supply adjacent lines of $C_2$ samples in parallel to a two-dimensional spatial interpolator 106.

Interpolators 105 and 106 supply resampled signals $C_1$ and $C_2$ to the digital-to-analog converters 11 and 12, respectively. $C_1$ and $C_2$ are each resampled to the same spatial sampling density as Y.

Figure 2:
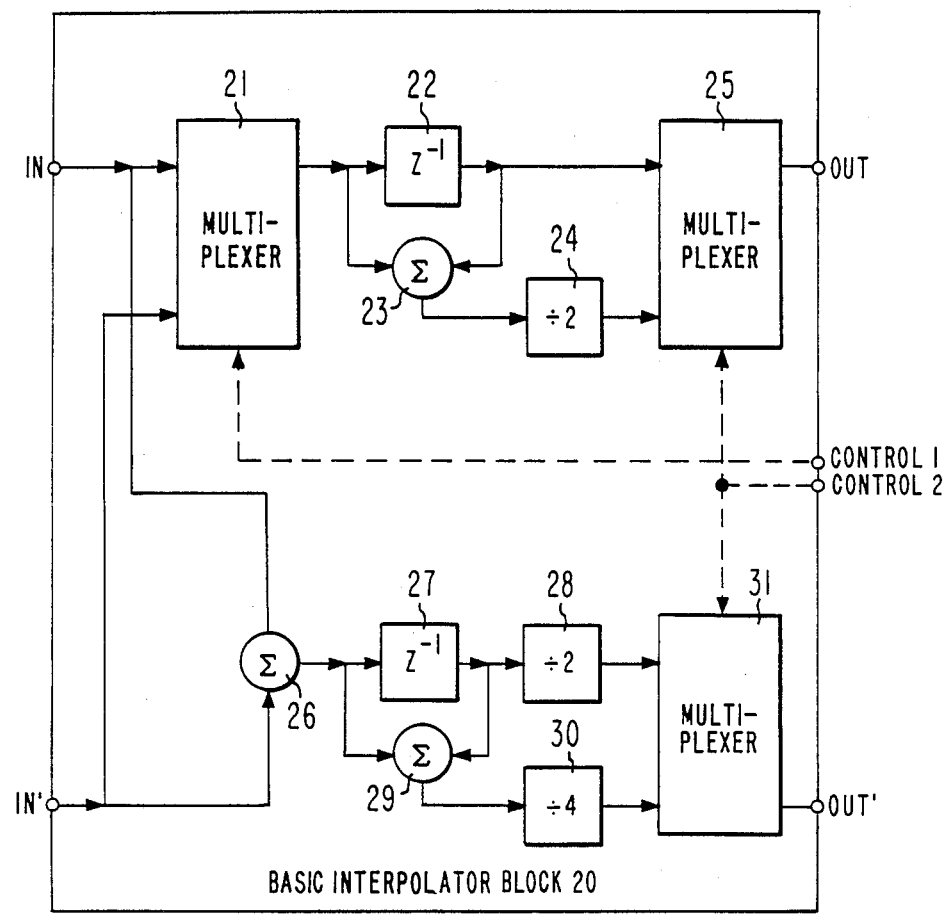
FIG. 2 is a schematic diagram of a basic interpolator block, used as a building block in interpolators that may be used in implementing the FIG. 1 television display system.

FIG. 2 shows a novel basic interpolator block 20 that can be used as a basis for the construction of each of the interpolators 105 and 106, to provide for each of them being bilinear interpolators. The output pixel scan rate from the block 20 is double the input pixel scan rate to its input terminals IN and IN'. Respective streams of pixel samples from adjacent scan lines in subsampled image space are repetitively supplied at output scan line rate to terminals IN and IN' of interpolator block 20. Each scan line in subsampled image space is repeated either $2^{(n+1)}$ times, or one less time, where $2^n:1$ spatial interpolation is performed in the direction transverse to scan lines, n being a positive integer at least unity. Repeating the scan lines $2^{(n+1)}$ times simplifies the clocking of the line store RAMs 101–104. In either case, the line store RAMs 101–104 can be loaded during two successive line retrace intervals, rather than just one.

A multiplexer 21 responds to a CONTROL 1 signal to select the one of the streams of pixels applied to terminal IN and IN' for spatial interpolation that is earlier-in-time in the direction of line scanning. As a first step in this interpolation the selected stream of pixels is applied to a one-pixel-delay circuit 22. The pixels from the selected stream are summed in an adder 23 with the pixels from the selected stream as delayed one pixel by circuit 22, and the resultant sum is divided by two in a bit-place shifter 24 to supply the average of two successive pixels in the stream selected by multiplexer 21. A multiplexer 25 alternately selects to the terminal OUT of interpolator block 20 the delayed pixel output of circuit 22 and that average of two successive pixels. This selection by multiplexer 25 is made at the pixel output rate that is twice the pixel input rate.

Terminal OUT' of interpolator block 20 supplies another stream of pixels at this pixel output rate, representative of an interpolated scan line preceding the scan line supplied through terminal OUT. This interpolated scan line is generated as follows. The streams of pixels supplied to terminals IN and IN' of interpolator block 20 are summed in an adder 26 and applied to a one-pixel-delay circuit 27. The output of circuit 27 is divided by two by a one-bit-place shifter 28 to supply pixels for the interpolated scan line which are interpolated only in the direction transverse to the scan line direction. Pixels for the interpolated scan line which are also interpolated in the direction of the scan line are generated by (1) summing in an adder 29, the adder 26 output and the adder 26 output as delayed one pixel in circuit 27 and (2) dividing the resultant sum from adder 29 by four in a two-bit-place shifter 30. A multiplexer 31 alternately selects to terminal OUT' of interpolator block 20 the pixels for the interpolated line scan that are not interpolated in the direction of line scan and those pixels that are. This selection by multiplexer 31 is made at the pixel output rate, which is twice the pixel input rate.

Interpolator block 20 resamples its input data as supplied to terminals IN and IN' to provide at its terminals OUT and OUT' samples at 4:1 higher scan rate. However, these samples are not in regular scan line order.

Figure 3:
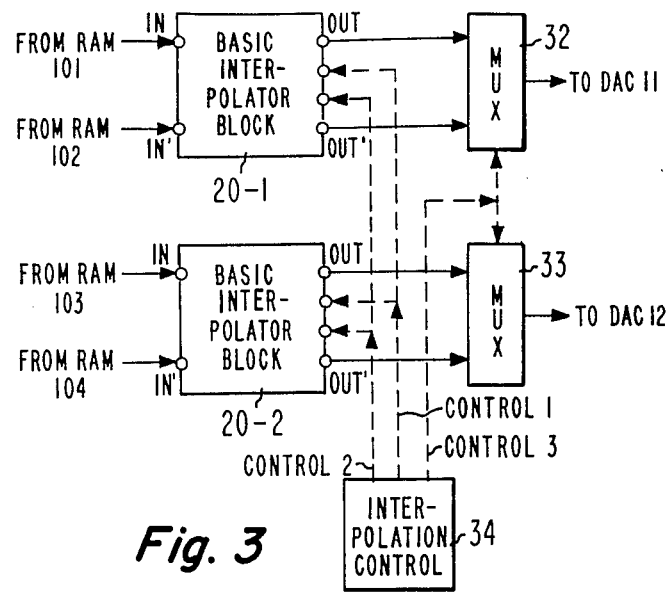
FIGS. 3 and 4 are schematic diagrams of two interpolators, each constructed using one or more FIG. 2 basic interpolator blocks, and each applicable for use in the FIG. 1 television display system.

FIG. 3 shows how interpolators 105 and 106 of FIG. 1 can be constructed using two basic interpolator blocks 20-1 and 20-2 together with multiplexers 32 and 33, when 2:1 spatial interpolation is desired both in the direction of scan line extension and in the direction transverse to the scan lines. Multiplexers 32 and 33 operate to place the higher scan rate $C_1$ and $C_2$ samples in regular scan line order. Line storage RAMs 101, 102, 103 and 104 are each read four (or three) times before being re-written. When interpolators 105 and 106 are constructed per FIG. 3, RAMs 101 and 103 are written simultaneously, and RAMs 102 and 104 are written simultaneously. There is a two-scan-line offset between the writing of RAMs 101 and 103 and the writing of RAMs 102 and 104, when the interpolators 105 and 106 are constructed per FIG. 3.

Interpolation control circuitry 34 supplies CONTROL 1 signal at the input line advance rate to both the basic interpolator blocks 20-1 and 20-2. Circuitry 34 also supplies them both with the CONTROL 2 signal at twice the input scan rate (which in the FIG. 3 interpolators equals the output pixel scan rate). Circuitry 34 further supplies a CONTROL 3 signal switching at input line advance rate to each of the multiplexers 32 and 33. Multiplexers 32 and 33 provide input data for digital-to-analog converters 11 and 12 by selecting the two interpolated signals from the terminals OUT' of blocks 20-1 and 20-2 respectively during one set of alternate output lines. During the intervening set of alternate output lines, multiplexers 32 and 33 provide input data for converters 11 and 12 by selecting the two interpolated scan lines from the terminals OUT of blocks 20-1 and 20-2 respectively. Multiplexer 32 arranges the output scan lines of $C_1$ in correct sequential order, compensating against the reversals of scanning line order in line-storage RAMs 101 and 102 accepted in order to reduce the frequency of their re-writing. In like manner multiplexer 33 arranges the output scan lines of $C_2$ in correct sequential order, compensating against the reversals of scanning line order in line-storage RAMs 103 and 104. Cascade connections of pluralities n in number of basic interpolator blocks replacing the single basic interpolator blocks 20-1 and 20-2 can be used to implement $2^n:1$ spatial interpolation both in the direction of scan line extension and in the direction transverse to scan lines.

Figure 4:
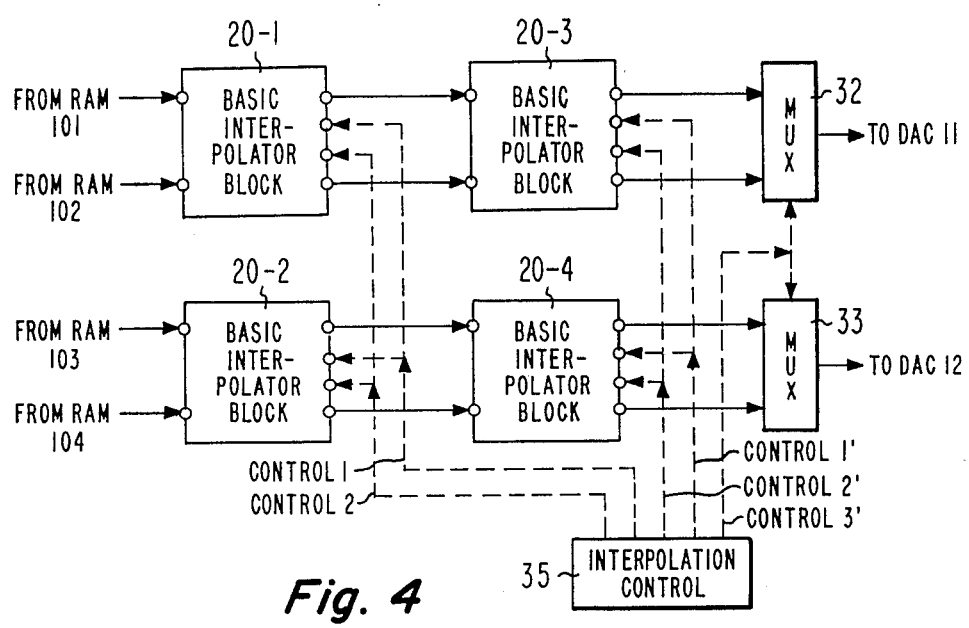

FIG. 4 shows how interpolators 105 and 106 can be constructed to provide 4:1 spatial interpolation in each of these directions. Basic interpolator block 20-1 is followed in cascade connection by another basic interpolator block 20-3 and multiplexer 32 in this embodiment of interpolator 105. Basic interpolator block 20-2 is followed in cascade connection by another basic interpolator block 20-4 and multiplexer 33 in this embodiment of interpolator 106. Line storage RAMs 101, 102, 103 and 104 are each read eight (or seven) times before being re-written when interpolators 105 and 106 are constructed per FIG. 4. RAMs 101 and 103 are written simultaneously, and RAMs 102 and 104 are written simultaneously. There is a four-scan-line offset between the writing of RAMs 101 and 103 and the writing of RAMs 102 and 104, when the interpolators 105 and 106 are constructed per FIG. 4.

Interpolation control circuitry 35 supplies the CONTROL 1 signal to both the blocks 20-1 and 20-2 at one half their output line advance rate. Interpolation control circuitry 35 also supplies the CONTROL 2 signal at twice the pixel scan rate from line-storage RAMs 101-104 to both of the blocks 20-1 and 20-2. In the FIG. 4 interpolators this rate equals one-half the output pixel scan rate. Interpolation control circuitry 35 also supplies the CONTROL 3 signal switching at the input line advance rate to multiplexers 32 and 33. As in the FIG. 3 interpolation circuitry, multiplexers 32 and 33 compensate for line scanning order reversals in line-storage RAMs 101-104.

Basic interpolator blocks 20-1 and 20-2 supply, to basic interpolator blocks 20-3 and 20-4 in cascade after them, twice as many input scan lines as they received from the line storage RAMs 101-104. Accordingly, interpolation control circuitry 35 supplies a CONTROL 1' signal to the CONTROL 1 signal connections of basic interpolator blocks 20-3 and 20-4 at one half their output line advance rate—that is, at the output line advance rate of basic interpolator blocks 20-1 and 20-2.

Basic interpolator blocks 20-3 and 20-4 receive pixels from basic interpolator blocks 20-1 and 20-2 at twice the pixel scan rate from line-storage RAMs 101-104. Interpolation control circuitry 35 supplies a CONTROL 2' signal to the CONTROL 1 signal connections of basic interpolator blocks 20-3 and 20-4 at the twice their pixel input rate, which is four times the pixel output rate from line-storage RAMs 101-104.

Figure 5:
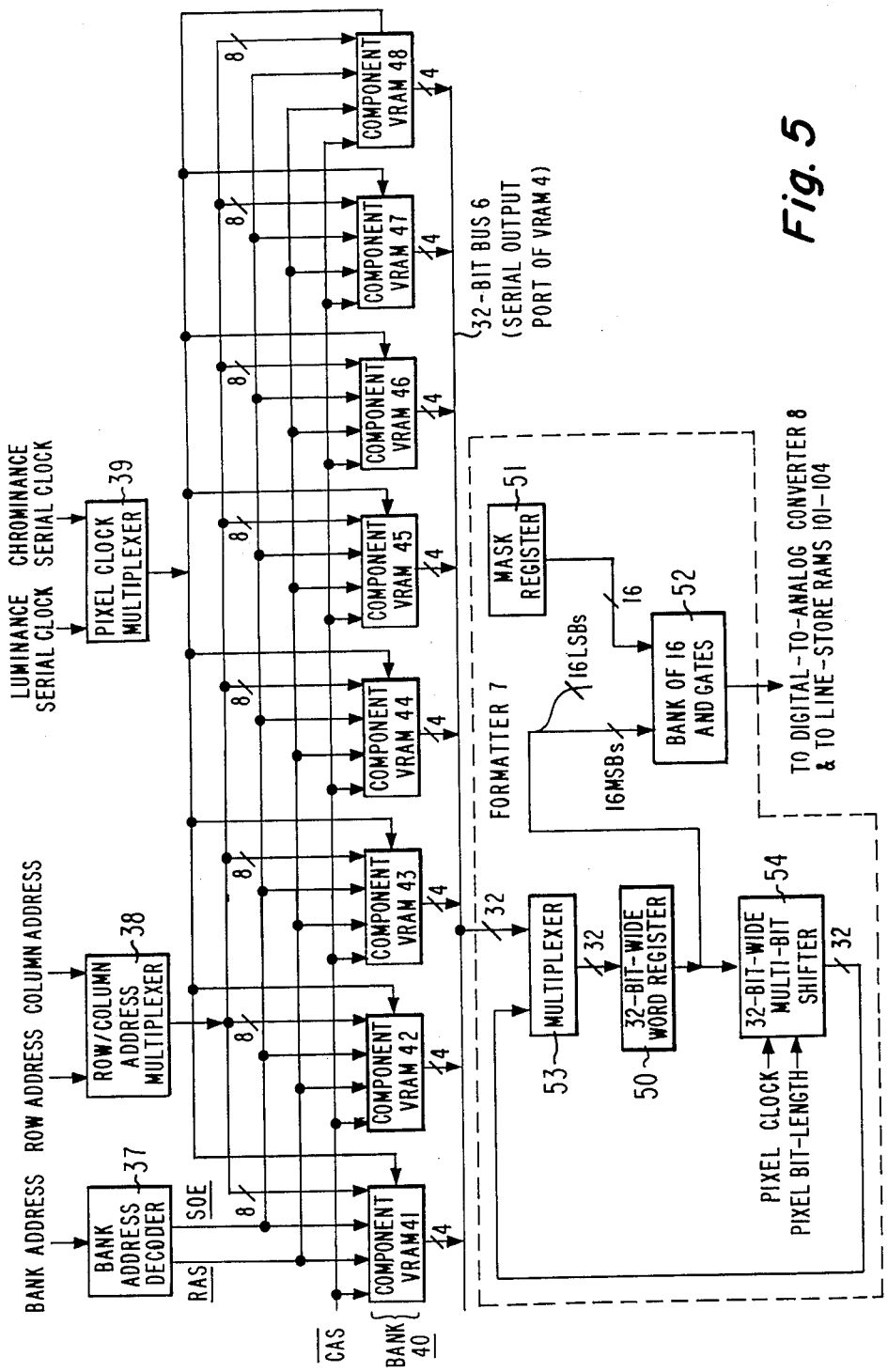
FIG. 5 is a schematic diagram of video random-access memory architecture used in the FIG. 1 television display system.

FIG. 5 shows more particularly the construction of one bank of VRAM 4, a thirty-two-bit-wide data bus 6 connecting VRAM 4 serial output port to formatter 7, and formatter 7 which performs the pixel-unwrapping function. VRAM 4 comprises at least one bank 40 of eight component VRAMs. FIG. 5 is offered as an aid to understanding more completely how the luminance information and chrominance data can be stored in separate bit-map organizations.

In preferred embodiments of the invention, the bit-maps are stored in VRAM 4 as if the following mapping procedure were followed. Each of the several-bit-pixel data is converted from parallel-bit to serial-bit format according to a prescribed ordering rule. The successive pixel data in each scan line are then strung together seriatim. The resulting strings of bits descriptive of a display scan line are then strung together in the order of display scan line advance, so the description of a complete image field is afforded by the resulting still longer string of bits. This string of bits is then mapped into successive rows of VRAM 4 in a procedure called "linear packing". Linear packing permits the density of storage in VRAM 4 to be as high as possible despite the bit-length of the pixel codes being chosen from a plurality of code lengths submultiple to the number of bits in a row of a VRAM 4 bank, such as bank 40. A commercially available component 64 K×4 VRAM contains four square dynamic memory arrays bits on a side, it also contains static memory operable to provide four parallel-in/serial-out registers as buffer memory to a four-bit wide serial output port. A bank of eight such component VRAMs provides 256 rows of 256 four-byte digital words, and these dimensions will be assumed by way of example for VRAM 4 throughout the remainder of this specification.

The loading of the static memories in the component VRAMs, which serve as buffer memories to the serial output port of VRAM 4, is controlled by a SERIAL READ-OUT ADDRESS CODE called SRAC for short. SRAC is a three part code consisting of a first group of adjacent bit places containing a BANK ADDRESS, a second group of adjacent bit places containing a ROW ADDRESS and a third group of adjacent bit places containing COLUMN ADDRESSES. The ROW ADDRESS and COLUMN ADDRESS portions of SRAC are descriptive of storage location placement in VRAM 4 and are not directly related to the dimensions of the display raster, the bit-map organization for luminance pixel codes or the bit-map organization for chrominance pixel codes. SRAC will be assumed to code BANK ADDRESS in its most significant places, which is preferable to do from the viewpoint of allowing easy add-on of more banks of component VRAMs. SRAC will be assumed to code COLUMN ADDRESS in the least significant group of eight bit places and to code ROW ADDRESS in the next least significant group of eight bit places. Each of the $2^m$ values of BANK ADDRESS is assigned solely to a respective bank of VRAM 4, and a bank address decoder 37 for that bank 40 of VRAM 4 to which the current value of those m bits is assigned responds to that value to condition bank 40 of VRAM 4 for reading out to the thirty-two bit wide data bus 6. This arrangement makes possible the multiplexed connection of the banks 40, etc. of VRAM 4 to bus 6.

The ROW ADDRESS portion of SRAC governs the choice of row to be loaded for the serial-access output port of at least the selected bank 40 of VRAM 4. Bank 40 (like the other banks of VRAM 4) comprises a respective octet of component VRAMs 41, 42, 43, 44, 45, 46, 47, 48 each having a four-bit-wide serial-access port. The number of bits in a row of VRAM 4 serial output is 256 columns times 32 bits per column, for a total of $2^{13}$ bits. It is convenient to describe the luminance or chrominance component signal of a display line in a number of bits related to the number of bits per row of VRAM 4 in integral-power-of-two ratio. A display line of high-resolution luminance component signal, for example, might comprise 1024 eight-bit pixels so it is in 1:1 ratio with a row in VRAM 4, in terms of numbers of bits. A display line of intermediate-resolution luminance component signal might comprise 512 eight-bit pixels and is thus in a 1:2 ratio with a row in VRAM 4, in terms of numbers of bits. A display line of lower-resolution luminance component signal might comprise 256 four-bit pixels so it is in a 1:8 ratio with a row of VRAM 4, in terms of numbers of bits. Four display lines of a chrominance component spatially subsampled 4:1 in both display-line-scan and display-line-advance directions relative to these luminance component signals would respectively be in 1:16, 1:32 and 1:128 ratios with a row of VRAM 4, in terms of numbers of bits.

The COLUMN ADDRESS portion of SRAC specifies an offset in the counter-generated addresses for the static memories in component VRAMs 41-48 etc, during their reading. The static memories in each component VRAM are written in parallel from the associated dynamic memory in that component VRAM with zero-valued offset. The serial reading of the static memories through the serial output ports of the component VRAMs in the selected bank 40 of VRAM 4 begins at the column location specified by the COLUMN ADDRESS portion of SRAC. Where a plurality of display lines of information are stored in a VRAM 4 row, the COLUMN ADDRESS portion of SRAC permits the serial output from VRAM 4 to commence at the beginning of any one of the display lines of information.

Except when the number of bits in a display line equals or exceeds the number of bits per row in VRAM 4, the row of VRAM 4 transferred to the static memories in the component VRAMs 41-48 of the selected bank 40 generally will not be fully read out before those static memories are re-written. The underlying reason for this is that luminance pixel codes are read from VRAM 4 during line trace intervals through the same serial output port that chrominance pixel codes are read from VRAM 4 during line retrace intervals. This time-division-multiplexing between two bit-map organizations requires that the static memories be rewritten each time data from a different one of the two bit-map organizations is to be read out.

Any particular bank of VRAM 4 can be selected responsive to the BANK ADDRESS portion of SRAC, which has m bits, where $2^m$ is the number of banks of component VRAMs in VRAM 4. Each bank of VRAM 4 has a respective bank select decoder for decoding the BANK ADDRESS portion of SRAC, analogous to bank select decoder 37 for bank 40 of VRAM 4. All component VRAMs in VRAM 4 have respective $\overline{TR/OE}$ pins (not shown). All these $\overline{TR/OE}$ pins receive in parallel a LOW-logic condition as a TRANSFER signal at times of transfer of a row of data in any one of VRAM 4 banks to the static memory therein from which serial output port is supplied data. The $\overline{TR/OE}$ pins for a selected bank also receive a LOW logic condition as an OUTPUT ENABLE signal when the random-access output/input port is accessed in an aspect of operation not connected with the present invention. The TRANSFER signal is executed as a command only when a ROW ADDRESS STROBE signal is applied to a $\overline{RAS}$ pin of each component VRAM involved. Bank address decoder 37 applies a high-to-low transition only to the $\overline{RAS}$ pins of the selected bank 40 of component VRAMs 41-48 when a row of data is to be transferred into the auxiliary-static-memory portions of component VRAMs 41-48.

A row/column address multiplexer 38 applies ROW ADDRESS to the eight ADDRESS pins of the component VRAMs 41-48 to indicate which row of data is being transferred for serial output. RAS is then allowed to go high, and column address multiplexer 38 applies COLUMN ADDRESS to the eight ADDRESS pins of component VRAMs 41-48. A COLUMN ADDRESS STROBE is applied to the $\overline{CAS}$ pins of VRAMs 41-48; this signal going low loads the internal address counters of VRAMs 41-48 with appropriate offsets for serial read out. $\overline{CAS}$ is then allowed to go high.

A pixel clock multiplexer 39 selects between the LUMINANCE SERIAL OUTPUT CLOCK and CHROMINANCE SERIAL OUTPUT CLOCK signals for application to the serial clock or SC pins of the component VRAMs. Bank address decoder 37 applies a low condition to the SOE pins of only the selected bank 40 of component VRAMs as a SERIAL OUTPUT ENABLE signal during the serial output from VRAM 4. This conditions the serial output ports of component VRAMs 41-48 to be multiplexed to the 32-bit-wide bus 6. The LUMINANCE SERIAL OUTPUT CLOCK and CHROMINANCE SERIAL OUTPUT CLOCK are both generated by a respective programmable division from a MASTER CLOCK signal.

Details of the construction of the formatter 7 for parsing the successive 32-bit words from the serial output port bus 6 into pixels are shown in FIG. 5. A 32-bit word register 50 holds thirty-two successive bits, a number n of the most significant of these bits being the code descriptive of luminance or chrominance. For convenience n is constrained to be an integral power of two, sixteen or less. A programmable mask register 51 holds a group of n ONEs in the most significant of its sixteen bit places and a group of (16−n) ZEROs in the least significant bit places. The contents of mask register 51 and the sixteen most significant bits of the word contained in register 50 have their corresponding bit places ANDed in a bank 52 of AND gates to furnish selected signal pixels of luminance or chrominance data. Where these data are shorter than sixteen bits, the bit places of lesser significance are filled by ZEROs. (In alternative designs this data may be constrained to always be eight bits or less, with mask register 51 being shortened to eight-bit length and bank 52 including only eight AND gates.)

When the first thirty-two bit word in a row of VRAM 4 is supplied to formatter 7 via serial output port bus 6, a multiplexer 53 admits that word to the 32-bit word register 50. The n most significant bits of that word defining a pixel datum are provided to the digital-to-analog converter 8 shown in FIG. 1 in the case where a luminance bit-map in VRAM 4 is scanned, or are provided to an appropriate one of the line store RAMs 101–104 of chroma resampling apparatus 10 in the case where a chrominance bit-map in VRAM 4 is being scanned.

When the next $(32-n)/n$ pixel data are being provided to digital-to-analog converter 8 or to chroma resampling apparatus 10, multiplexer 53 successively admits the $(32-n)/n$ successive output of a 32-bit multi-bit shifter 54 to word register 50. Shifter 54 shifts n bits toward increased significance with each successive pixel as timed by PIXEL CLOCK pulses.

As the modulo-n first pixel datum is to be provided to digital-to-analog converter 8 or to chroma resampling apparatus 10, multiplexer 53 admits a new 32-bit word into register 50 instead of shifting the old word. Multiplexer 53 can be controlled by decoding one output of a modulo-n pixel counter, for example. This counter can consist of the last n stages of a modulo-32 counter counting at pixel clock rate, which counter together with a binary shifter comprises multi-bit shifter 54.

One skilled in the art and provided with the foregoing description of the interface between VRAM 4 and formatter 7 will readily discern possible variants in the VRAM 4 digital word organization and changes in the formatter 7 architecture to accommodate these variants. With each thirty-two-bit word read from VRAM 4, the pixel order may be opposite to that described, for example, in which case formatter 7 structure is altered as follows. The programmable mask register 51 holds a group of n ONEs in its least significant (rather than most significant) bit places. The group of $(16-n)$ ZEROs are held in the most significant bit places of mask register 51. The bank 52 of sixteen AND gates receives input from the sixteen least significant (rather than most significant) bit places of word register 50, as well as receiving input from mask register 51 with its modified mask contents. The multi-bit shifter 54 shifts n bits towards decreased significance (rather than increased significance) with each successive pixel as timed by PIXEL CLOCK pulses. Another variation readily conceived of is that the column or word read addresses in VRAM 4 may either increment or decrement as the display is horizontally scanned.

Figure 6:
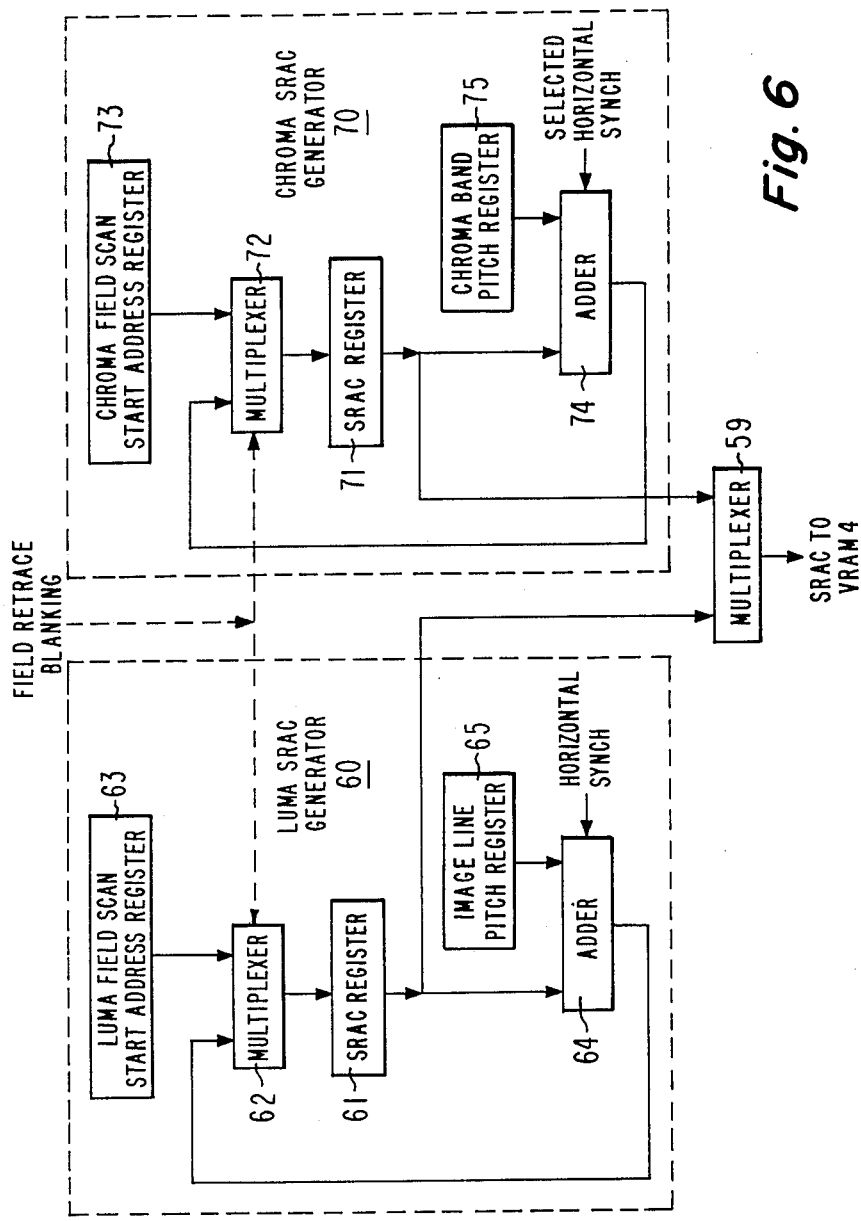
FIG. 6 is a schematic diagram of circuitry for generating the serial output port addressing for the FIG. 5 memory architecture.

FIG. 6 shows details of construction of the portion of VRAM read-out control 17 that generates SRAC in FIG. 1. SRAC is supplied to VRAM 4 from the output of a multiplexer 59 that selects the correct SRAC for the bit-map organization currently being scanned. This facilitates keeping track of where each scanning is along the linearly packed data of its particular bit-map organization. Two SRAC generators 60 and 70 are shown. Generator 60 generates SRAC for successive lines of luminance pixel data. Generator 70 generates SRAC for successive lines of chrominance pixel data. To permit just one SRAC generator 70 for both $C_1$ and $C_2$ descriptions of chrominance rather than having to have two SRAC generators, these descriptions are linearly packed in VRAM 4 interleaving $C_1$ and $C_2$ samples on a line by line basis.

SRAC generator 60 includes a SRAC latch register 61 for supplying a SRAC to one of the two inputs of multiplexer 59. SRAC latch register 61 contents are updated from the output of a multiplexer 62, controlled by FIELD RETRACE BLANKING pulses. During field retrace the FIELD RETRACE BLANKING pulse causes multiplexer 62 to select LUMA FIELD SCAN START ADDRESS supplied from a short address register 63, for updating register 61 contents. LUMA FIELD SCAN START ADDRESS identifies the storage location in VRAM 4 of the luminance pixel in the upper left corner of the following field. These LUMA FIELD SCAN START ADDRESSES are selected in prescribed order from a listing in a portion of main computer memory reserved for storing display instructions, and the listing of LUMA FIELD SCAN START ADDRESSES is maintained by the drawing processor 3.

During field trace intervals in time, the absence of FIELD RETRACE BLANKING pulse causes multiplexer 62 to select the sum output of an adder 64 for updating SRAC latch register 61 contents. Adder 64 has addenda supplied to it from SRAC latch register 61 and from a programmable display line pitch latch register 65. IMAGE LINE PITCH stored in latch register 65 is the product of the number of luminance samples per image line times the number of luminance-descriptive bits per luminance sample times the reciprocal of the number of bits per column address in VRAM 4—i.e., the number of luminance-descriptive bits per image line divided by thirty-two. Elements 61–65 are operated as an accumulator augmenting SRAC by IMAGE LINE PITCH during each line retrace interval. IMAGE LINE PITCH is loaded into latch register 65 by drawing processor 3. IMAGE LINE PITCH originates in compact disc player 2 or other video source, and it can be convenient to carry it in FIELD HEADER DATA preceding each field of bit-map-organized luminance or chrominance pixel data in VRAM 4.

SRAC generator 70 includes a SRAC latch register 71 for supplying a SRAC to the other of the two inputs of multiplexer 59, not supplied a SRAC from SRAC latch register 61 of SRAC generator 60. SRAC latch register 71 contents are updated from the output of a multiplexer 72 controlled by FIELD RETRACE BLANKING pulses. During a FIELD RETRACE BLANKING pulse, multiplexer 72 selects a CHROMA FIELD SCAN START ADDRESS supplied from a start address register 73, for updating register 71 contents. CHROMA FIELD SCAN START ADDRESS identifies the storage location in VRAM 4 of the $C_1$ pixel in the upper right corner of the following field. These CHROMA FIELD SCAN START ADDRESSES are listed together with LUMA FIELD SCAN START ADDRESSES in the portion of main computer memory reserved for storing display instructions, and the listing of these CHROMA FIELD SCAN START ADDRESSES is maintained by the drawing processor 3.

During field trace intervals in time, the absence of FIELD RETRACE BLANKING pulse causes multiplexer 72 to select the sum output of an adder 74 for updating SRAC latch register 71 contents. Adder 74 has addenda supplied to it from SRAC latch register 71 and from a programmable display band pitch register 75. A chroma display band is the number of display lines between the resampling of chrominance values. CHROMA DISPLAY BAND PITCH stored in latch register 75 is the product of the number of chrominance samples per chroma display band times the number of chrominance-descriptive bits per chrominance sample times the reciprocal of the number of bits per column address in VRAM 4—i.e., the number of chrominance-descriptive bits per chroma display band divided by thirty-two. Elements 71–75 are operated as an accumulator augmenting SRAC by CHROMA DISPLAY BAND PITCH during selected line retrace intervals separated by intervening chroma display band intervals. CHROMA DISPLAY BAND PITCH is loaded into latch register 75 by drawing processor 3 and originates similarly to IMAGE LINE PITCH.

Consider now the nature of the $C_1$ and $C_2$ chrominance signals used in the FIG. 1 television display system. $C_1$ and $C_2$ in this display system may be color-difference signals that can be linearly combined with the luminance signal Y using additive or subtractive combining processes. The differences between Y and two of the additive primary colors red (R), green (G) and blue (B) may comprise $C_1$ and $C_2$, for example. (R-Y) and (B-Y) color signals are often used. The color difference signals may be formed by the differences between Y and other mixture colors. I and Q signals similar to those used in the NTSC television broadcast standard are examples of such color difference signals.

$C_1$ and $C_2$ may also be color-difference signals normalized respective to luminance signal, [(R/Y)-1] and [(B/Y)-1], or I/Y and Q/Y, by way of examples. Normalization is removed from such a $C_1$ and $C_2$ signal by multiplying by Y before linearly combining with Y.

FIG. 7 shows an alternative chroma resampling apparatus 100 that may replace chroma resampling apparatus 10 in the FIG. 1 television display system. Chroma resampling apparatus 100 permits the storage of chrominance information in VRAM 4 in the form of read addresses for chroma map memories 115 and 116 which store $C_1$ and $C_2$ values, respectively. These read addresses can be expressed in shorter-bit-length chrominance codes than those needed to express $C_1$ and $C_2$ directly. Chroma map memories 115 and 116 are addressed in parallel, so only a single odd-line-store memory 111 and a single even-line-store memory 112 are required as rate-buffering memory for the time-compressed chrominance information.

Chroma map memory 115 is multiplexed by multiplexers 113 and 117 to convert the successive read address contents of line-store memories 111 and 112 to a stream of odd-line $C_1$ samples and a stream of even-line $C_2$ samples successively fed to latch 121 and to latch 122, respectively. The streams of samples supplied to latches 121 and 122 are offset slightly in time, but the paired samples in latches 121 and 122 are admitted parallelly in time into $C_1$ interpolator 105.

Similarly, chroma map memory 116 is multiplexed by multiplexers 113 and 118, on the one hand, to convert the successive read address contents of line store memories 111 and 112 to a stream of odd-line $C_2$ samples successively fed to latch 123 and, on the other hand, to convert the successive read address contents of line-store memories 111 and 112 to a stream of even-line $C_2$ samples successively fed to latch 124. The paired samples in latches 123 and 124 are admitted parallelly in time into $C_2$ interpolator 106.

The $C_1$ and $C_2$ samples from interpolators 105 and 106 are temporally aligned with corresponding Y samples supplied directly from formatter 7. The streams of $C_1$ and $C_2$ samples are supplied as input signals to digital-to-analog converters 11 and 12, and the stream of Y samples is supplied as an input signal to digital-to-analog converter 8. The remainder of signal processing is done as before.

FIG. 8 shows a luminance rate-buffer memory 80 being used between pixel-unwrapping formatter 7 and digital-to-analog converter 8 in a modification of either the FIG. 1 or FIG. 7 television display system. Rate-buffer memory 80 includes a Y odd-line store RAM 81 and a Y even-line store RAM 82 that are written during respective time-interleaved sets of display line retrace intervals. The rate of writing line-store RAMs 81 and 82 may differ from the pixel scan rate in the display. Typically, it is higher, in order to extend the interval during which the $C_1$ and $C_2$ line store RAMs 101–104 can be written, to include a portion of the line trace interval as well as the line retrace interval. During each display line trace interval in which one of the Y line store RAMs 81 and 82 is being written into, the other of the Y line store RAMs 81 and 82 is being read from at the pixel scan rate. A multiplexer 83 selects this read-out as input signal to the digital-to-analog converter 8. While the sample-and-hold operation of digital-to-analog converter 8 provides a degree of spatial low-pass filtering to the analog Y signal supplied to video matrix 9, it is desirable to augment this filtering if the pixel scan rate is comparatively slow, in order to suppress aliasing that appears as excessive luminance "blockiness" in the displayed image.

The manner in which video information is packed into the VRAM in accordance with aspects of the invention will now be described in further detail. Before dealing with the way that the VRAM is organized in accordance with the invention when chrominance is sampled less densely in image space than luminance, consider the way that the VRAM is organized when luminance and chrominance are sampled with equal densities in image space. Sampling luminance and chrominance with equal densities is feasible to do in embodiments of the invention using the FIG. 8 luminance rate-buffer memory 80.

Figure 9:
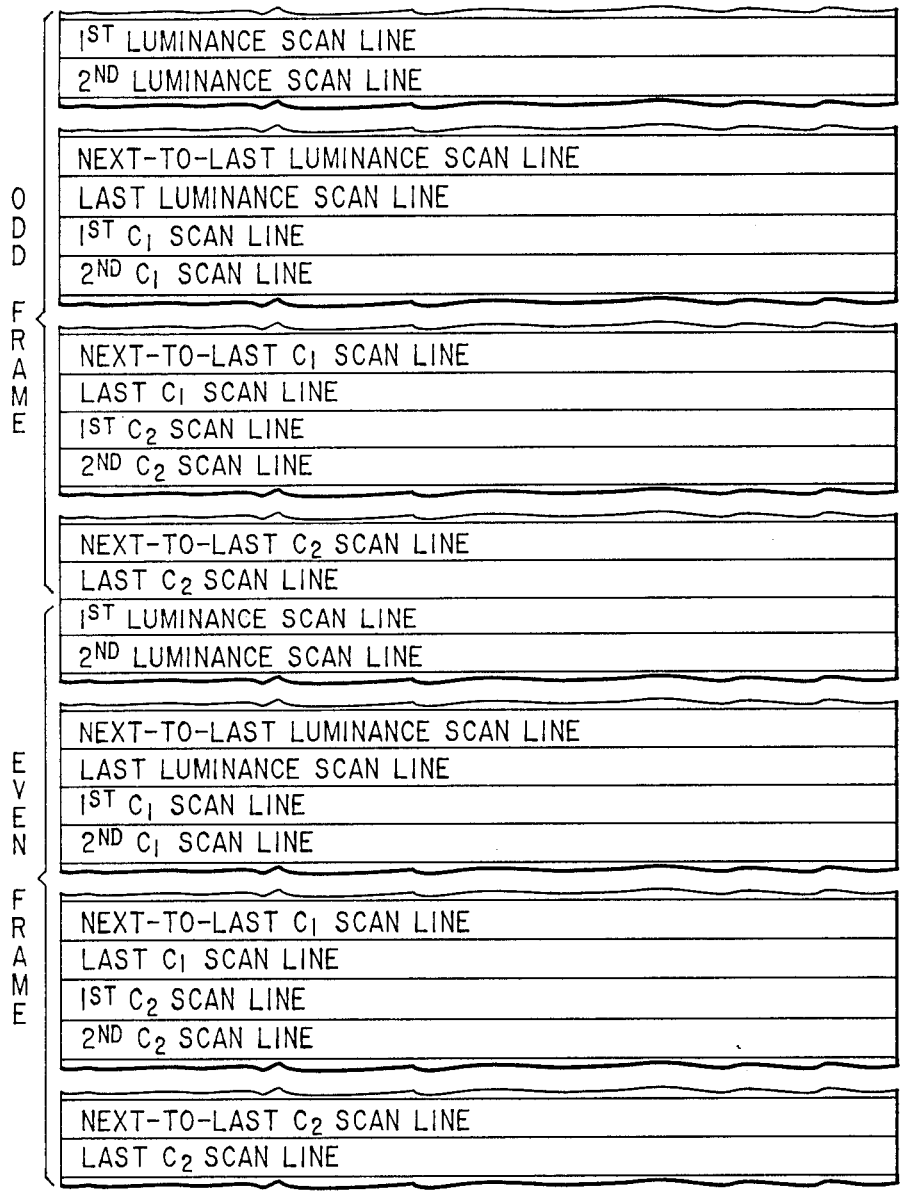

FIG. 9 shows one way that separate bit-map organizations for Y, $C_1$ and $C_2$ pixel variables may appear in VRAM 4 of the FIG. 1 television display system modified to include the FIG. 8 luminance rate-buffer memory 80. An odd frame and an even frame of video are stored in VRAM 4, one frame being updated while the other is read out to support the generation of the image displayed on kinescope 16. The first through last scan lines of the luminance content of each frame are stored in respective successive rows of VRAM 4, each of which rows is represented by a respective rectangle extending from left to right in the drawing. The first through the last scan lines of the $C_1$ content of each frame are similarly stored. So are the first through last scan lines of the $C_2$ content of each frame.

The rows containing the third through second-from-last scan lines of Y, $C_1$ and $C_2$ in each frame are omitted from FIG. 9 because of the difficulties involved showing all rows in VRAM 4, as are the VRAM rows outside image memory. For each of the pixel variables Y, $C_1$ and $C_2$, the variables are expressed in serial form and concatenated in order of pixel scan during line trace in the display to generate the bit stream, successive bits of which occupy successive columnar locations in the VRAM 4 row.

In reading out from VRAM 4 the Y, $C_1$ and $C_2$ scan lines for each successive line of display are read out in cyclic succession. The VRAM image memory packing shown in FIG. 9 requires a complex pattern of row addressing to implement this. Two chrominance SRAC generators like 70 in FIG. 6 are required in addition to the luminance SRAC generator 60. The image line pitch register 65 and the corresponding chroma band pitch registers store single image-line pitch values. The luma field scan start register 65 and the chroma field scan start registers store start addresses offset by at least the number of image lines per frame.

It should be noted that when odd and even frames are described in connection with FIGS. 9–16, this relates to the practice of displaying one frame while constructing the next frame in VRAM. Whether each frame is scanned on a one field per frame basis without line interlace, on a single-shuttered or plural-shuttered basis, or whether each frame is scanned on a two field per frame basis with line interlace on successive fields, in a single-shuttered or plural-shuttered basis, is essentially irrelevant to the VRAM packing. Whether line interlace on successive fields is used will, of course, be reflected in the luma and chroma SRAC generator pitch register contents.

Figure 10:
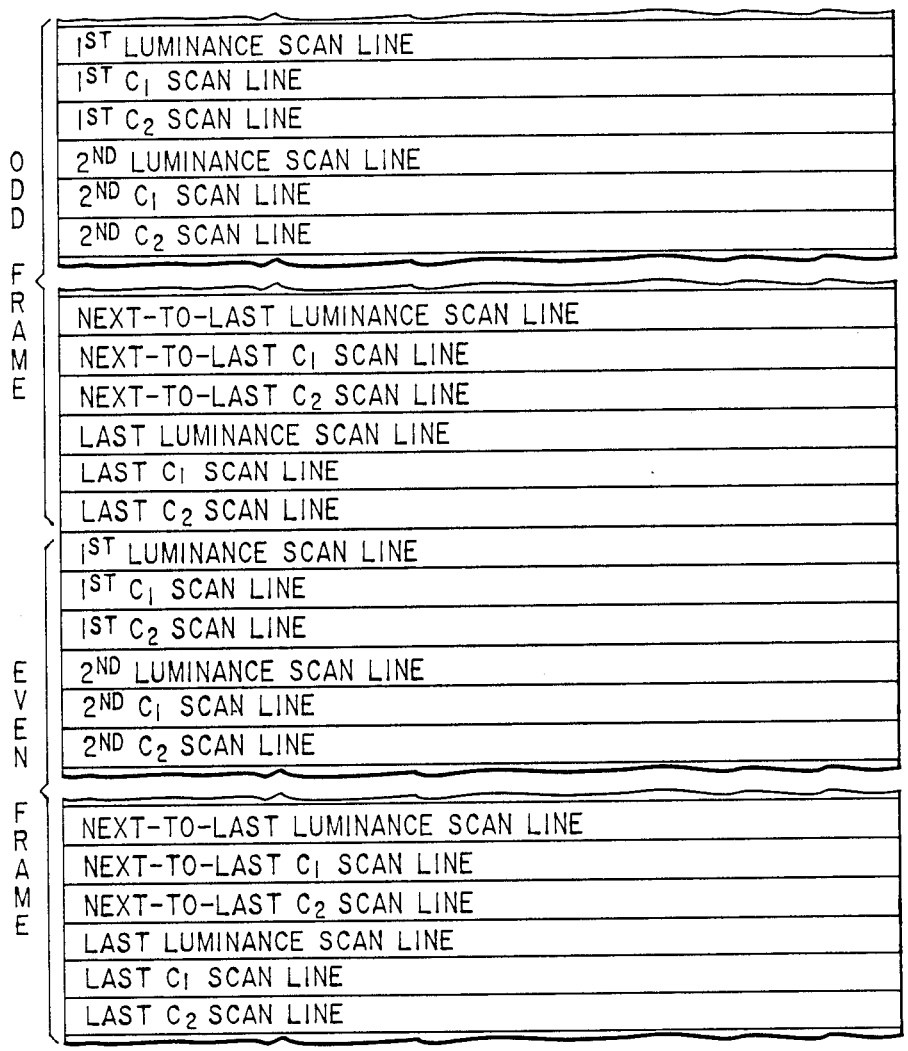

FIG. 10 illustrates how the lines of the separate bit-map organizations of Y, $C_1$ and $C_2$ can be interleaved with each other in writing the rows of VRAM 4, so that VRAM 4 can be read out using successive row addresses. These row addresses can be generated by SRAC generators similar to those described in connection with the VRAM packing shown in FIG. 9. However, the pitch registers store three-image line pitch values; and the luma field scan start register 63 and the chroma field scan start address register store values offset by one image line. Where programmability between the FIG. 10 VRAM packing and other types of packing is not sought, VRAM row read addresses may be simply generated by a counter. This principle for reducing the complexity of VRAM addressing may be applied in modified forms when chrominance is sampled less densely in image space than luminance is, to permit the use of just a single chroma SRAC generator 70.

Figure 11:
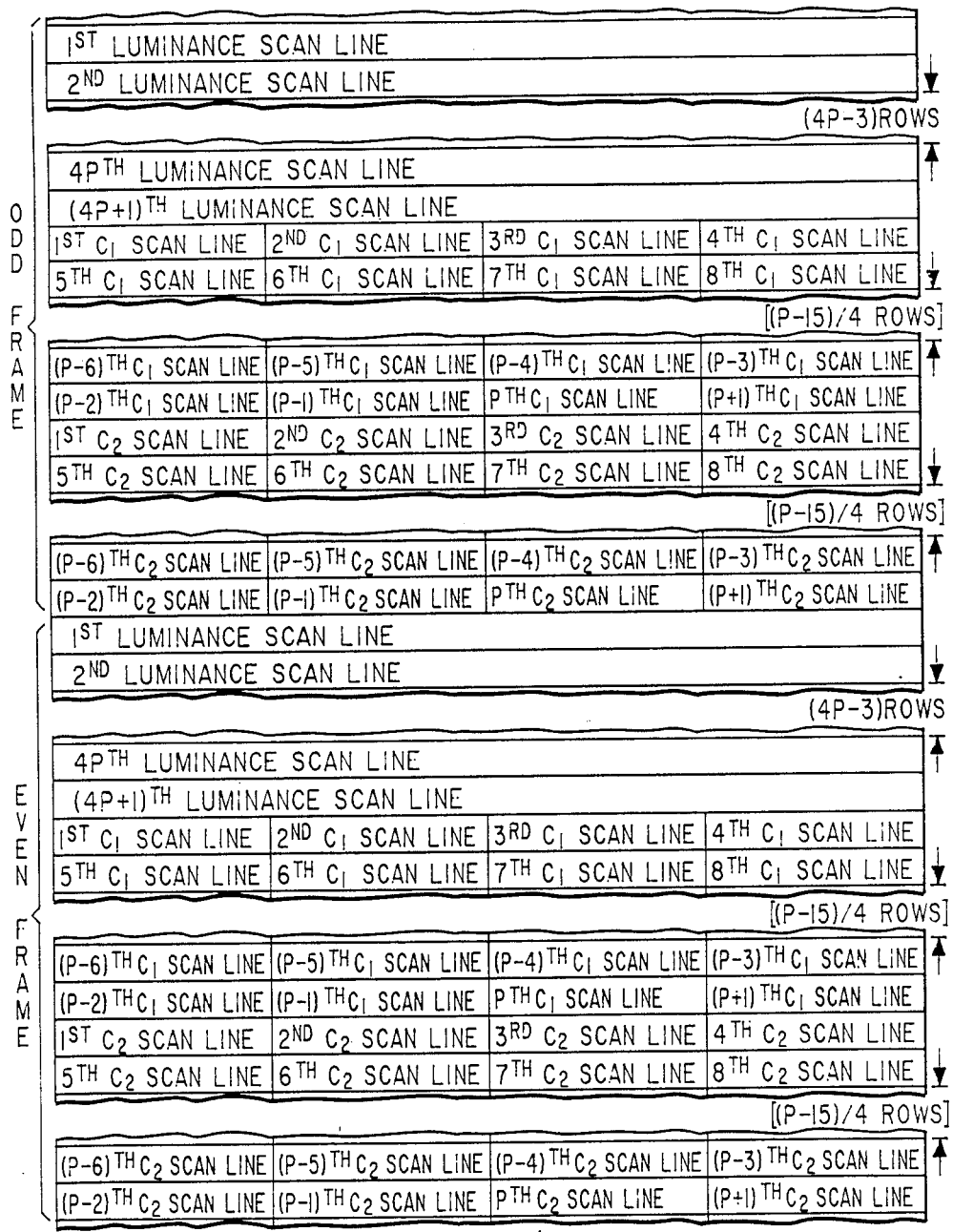

FIG. 11 shows how the separate bit-map organizations of Y, $C_1$ and $C_2$ could appear in VRAM 4 when the memory packing scheme of FIG. 9 is adapted so that the $C_1$ and $C_2$ samples of image space are one-quarter as dense as the luminance samples in both the pixel-scan and line-advance directions in the television display system of FIG. 1. The $C_1$ and $C_2$ interpolators 105 and 106 take the form shown in FIG. 4, or its equivalent. There is an integral number $P+1$ of scan lines for each of the chrominance values $C_1$ and $C_2$. Accordingly, there is an odd-numbered plurality ($4P+1$) of scan lines for luminance. For example: P might be 63, so $C_1$ and $C_2$ each have 64 scan lines and Y has 253 scan lines. FIG. 11 assumes $P+1$ to be evenly divisible by four. Where this is not the case, some of the rows in VRAM 4 will not be completely packed with $C_1$ and $C_2$ data. FIG. 11 also supposes Y, $C_1$ and $C_2$ variables to have the same number of bits for amplitude resolution, and that number of bits multiplied by the samples of luminance per line to equal the number of bits per row in VRAM. In this type of VRAM packing, two chroma SRAC generators are required in addition to luma SRAC generator 60.

Figure 12:
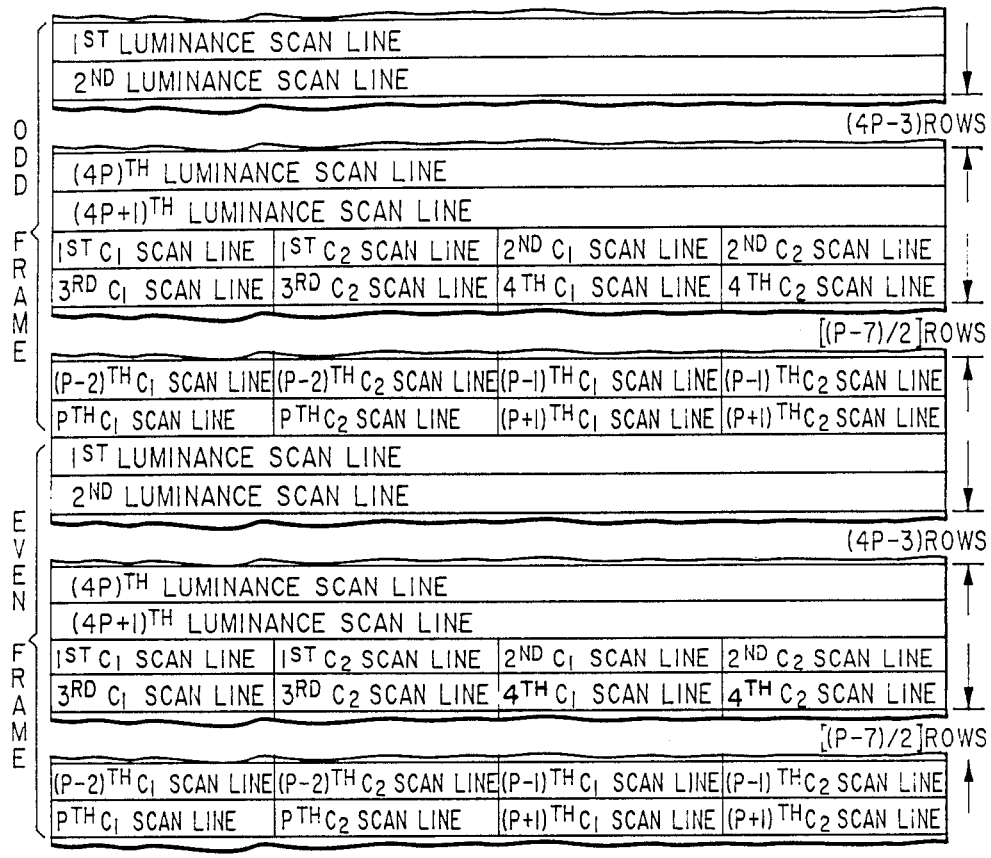

FIG. 12 shows how the VRAM packing used in FIG. 11 is modified using the principle previously taught in connection with FIG. 10. $C_1$ and $C_2$ scan lines are alternated in the rows of VRAM 4 so they may be scanned by successive row and column address values when being read during line retrace. This advantageously permits the use of just one chroma SRAC generator 70 together with luma SRAC generator 60. Note that chroma band pitch register 75 contents will treat a pair of simultaneously displayed $C_1$ and $C_2$ scan lines as the unit of pitch.

Figure 13:
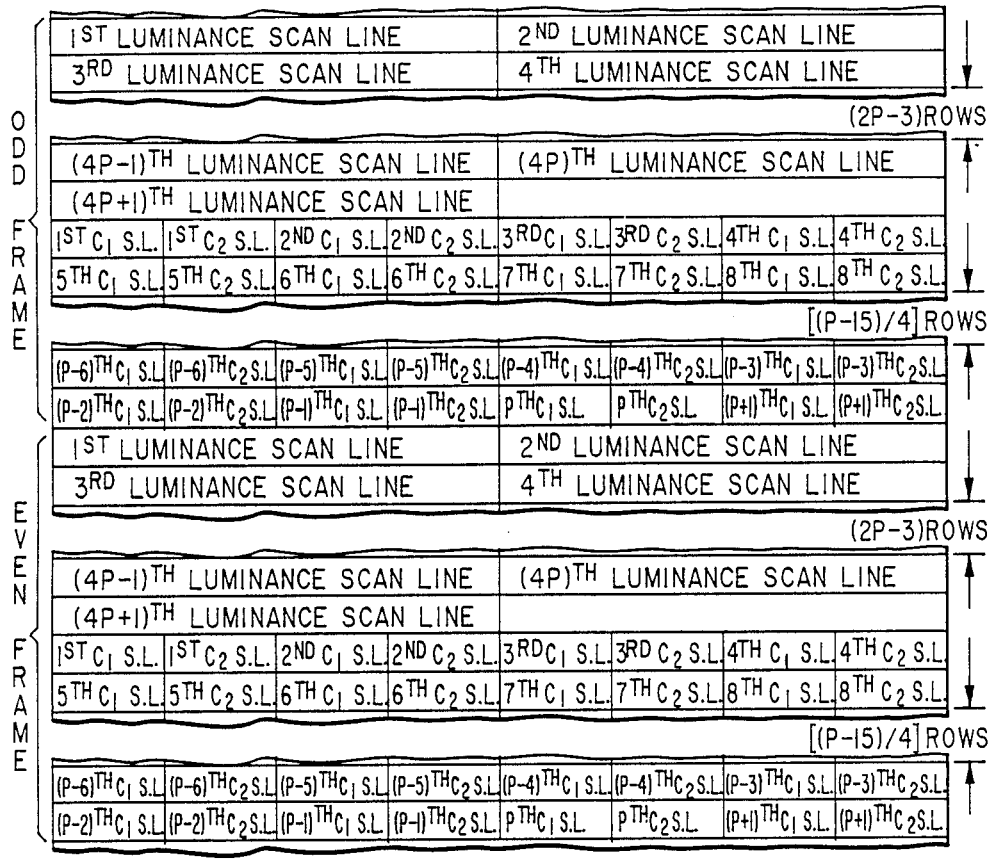

FIG. 13 shows how the FIG. 12 VRAM packing is changed when the product of the number of bits per luminance sample times the number of luminance samples per scan line are reduced to one-half the number of bits per row of VRAM 4. Comparing FIGS. 12 and 13, it should be apparent how VRAM 4 packing is affected when this product is reduced to smaller binary fractions of the number of bits per row of VRAM 4. Note that packing of the last luminance scan lines or chrominance scan lines will not always be perfect.

Figure 14:
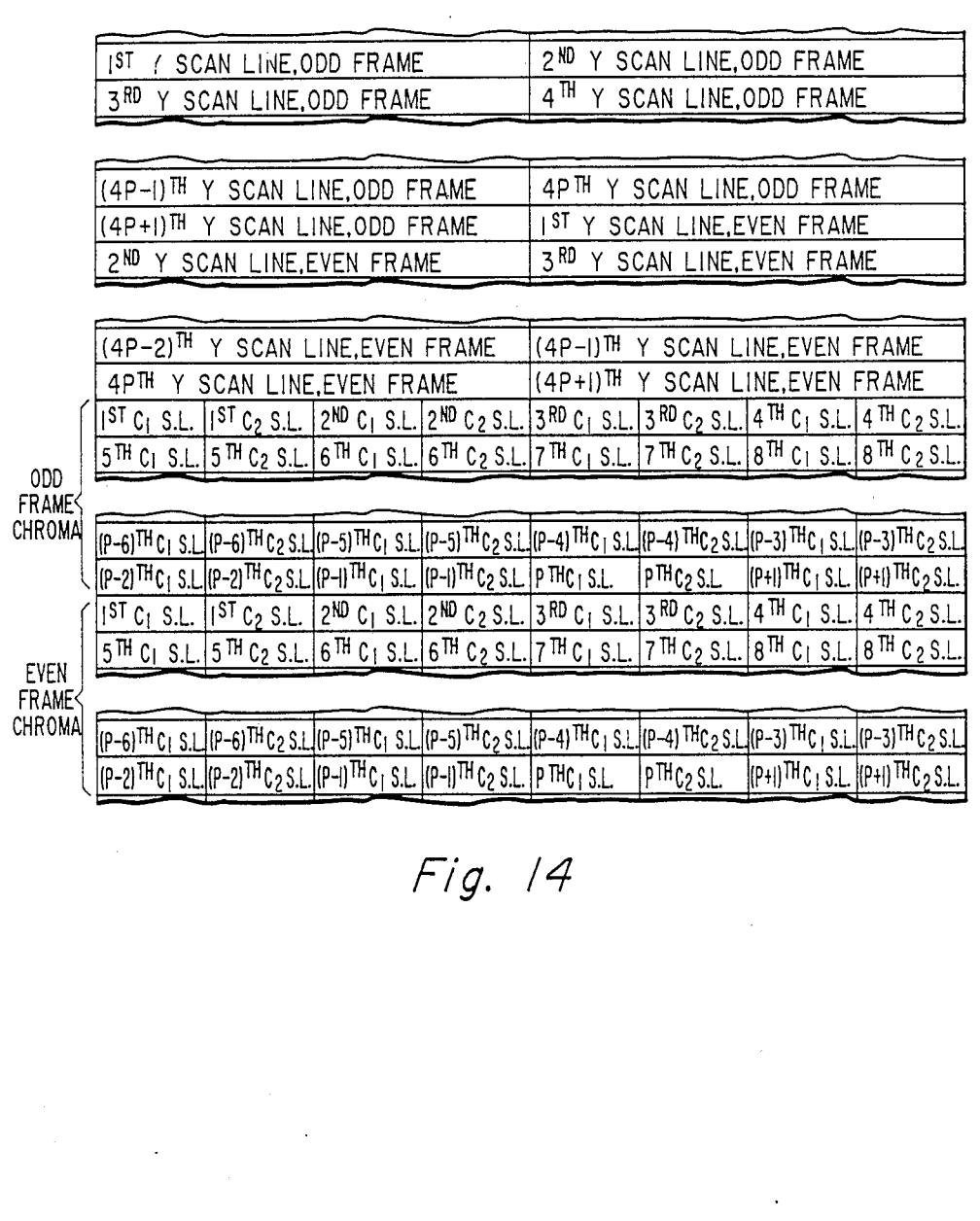

As shown in FIG. 14, this packing efficiency can be avoided without having to resort to complicated VRAM row addressing schemes. To do this, odd-frame luminance and even-frame luminance data are concatenated for storage in successive rows of VRAM 4. Also, odd-frame chrominance and even-frame chrominance are concatenated for storage in successive rows of VRAM 4, which will help packing efficiency when $P+1$ is not evenly divisible by four. This packing scheme also facilitates the start of chroma data packing in a part of a VRAM row left vacant by luminance.

Figure 15:
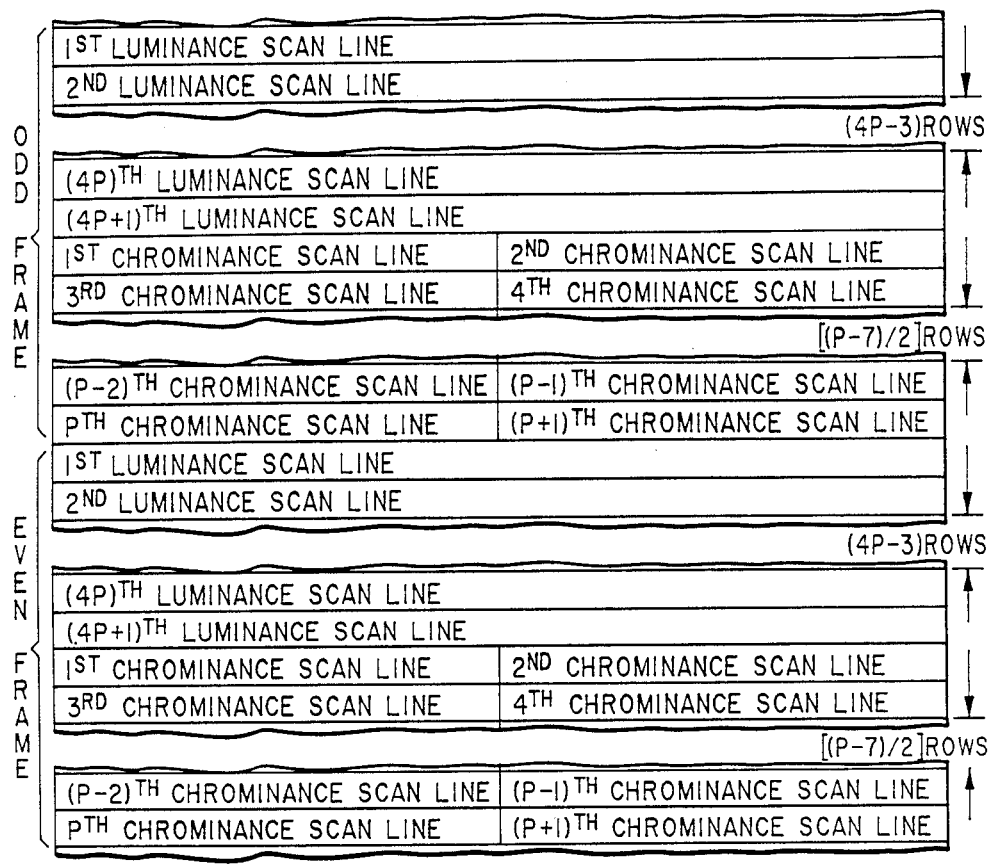

FIG. 15 shows how VRAM 4 may be packed when the number of chrominance samples in a scan line thereof is one half the number of luminance samples in a scan line thereof. This VRAM 4 organization could appear in a modification of the FIG. 1 television display system where $C_1$ and $C_2$ values sample image space one quarter so densely as luminance values in both directions. However, whereas in the VRAM packing shown in FIG. 13, $C_1$ and $C_2$ are presumed to be time-division-multiplexed on a scan line by scan line basis, in the VRAM 4 packing shown in FIG. 15 $C_1$ and $C_2$ are presumed to be time-division-multiplexed on a pixel-by-pixel basis. To accommodate this, the odd line store RAMs 101 and 103 are written in staggered phasing with alternate chrominance samples from VRAM 4, while even-line store RAMs 102 and 104 are read out in parallel; and the even line store RAMs 102 and 104 are written in staggered phasing with alternate chrominance samples from VRAM 4, while odd line store RAMs 101 and 103 are read out in parallel. That is, line store RAMs 101 and 103 have inputs multiplexed on a sample by sample basis, and so do line store RAMs 102 and 104. Only a single chroma SRAC generator 70 is required together with luma SRAC generator 60.

The VRAM 4 packing of FIG. 15 may also appear in the FIG. 7 television display system when the number of chrominance (memory map address) values per scan line thereof is one half the number of luminance values per scan line thereof. Each chrominance scan line is a series of bits descriptive of successive chroma map memory addresses.

Figure 16:
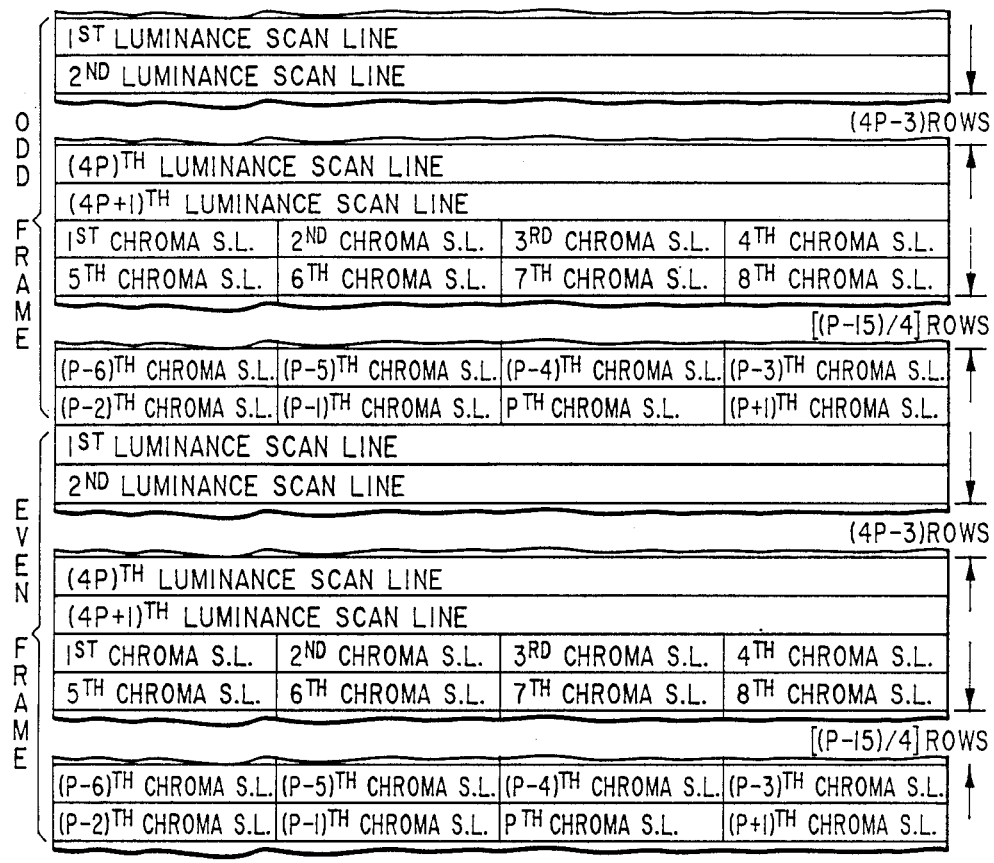

FIG. 16 shows VRAM 4 packing which would appear in the FIG. 7 television display system when the number of chrominance (memory map address) values per scan line is one-quarter the number of luminance values per scan line. As with FIG. 15, when considered descriptive of the FIG. 7 television display system, the number of bits per chroma map address is assumed in FIG. 16 to be the same as the number of bits per pixel descriptive of luminance.

T. R. Craver et al. in their concurrently filed U.S. patent application Ser. No. 918,565 now U.S. Pat. No. 4,719,503 entitled "DISPLAY PROCESSOR WITH COLOR MATRIXING CIRCUITRY AND TWO COLOR MAP MEMORIES STORING CHROMINANCE-ONLY DATA" and assigned to RCA Corporation describe the use of $C_1$ and $C_2$ pixel variables which take the form of color difference signals normalized respective to luminance. Where the video matrix used with the FIG. 7 television display apparatus is of the sort utilizing this form of $C_1$ and $C_2$ variables, the number of bits in the chroma map addresses may be made smaller than the number of bits descriptive of a luminance value, without impairing luminance/chrominance tracking. This is especially apt to be the case where the contents of the chroma map memories 115 and 116 can be updated during a display sequence in adaptive coding of normalized color-difference signals to respective chroma map address values, as described in detail by J. V. Sherrill et al. in their concurrently filed U.S. patent application Ser. No. 918,552 entitled "DISPLAY PROCESSOR UPDATING ITS COLOR MAP MEMORIES FROM THE SERIAL OUTPUT PORT OF A VIDEO RANDOM-ACCESS MEMORY" and assigned to RCA Corporation. Where the number of bits in chroma map addresses are fewer than the number of bits per pixel descriptive of luminance, the number of scan lines per row of VRAM 4 will be increased.

One skilled in the art and equipped with the principles taught in describing FIGS. 9-16 can readily design a variety of VRAM packing schemes consonant with the invention.

What is claimed is:

1. A method of packing a video random-access memory of the type having a parallel input-output port and a serial output port, with a frame or succession of frames of color video data, wherein said video data is stored in luminance and chrominance component form and respective components are arranged in separate bit maps, said method comprising the steps of:
   establishing independent start addresses for respective component bit maps;
   describing the luminance values of said frame or succession of frames in digitized sampled-data terms;
   arranging the bits of each of the digitized sampled-data luminance values in a prescribed order;
   stringing the digitized sampled-data luminance values in a prescribed serial order in accordance with a raster scan to generate a luminance bit stream;
   dividing the luminance but stream into lengths corresponding to integral numbers, including one, of horizontal scan lines of said raster scan, and said lengths being not longer than the number of bits per row of said video random-access memory, for writing into a respective set of rows of said video random-access memory;
   describing the chrominance values of said frame or succession of frames in digitized sampled-data terms;
   arranging the bits of each of the digitized sampled-data chrominance values in a prescribed order;
   stringing the digitized sampled-data chrominance values in a prescribed serial order in accordance with a raster scan to generate a chrominance bit stream; and
   dividing the chrominance bit stream into lengths corresponding to integral numbers, including one, of horizontal scan lines of said raster scan, and said lengths being not longer than the number of bits per row of said video random-access memory, for writing into a respective set of further rows of said video random-access memory;
   wherein said set of rows of luminance data forms a first bit map and said set of further rows of chrominance data forms a second bit map, and rows of data from both said first and second bit maps being accessible for sampling at said serial output port within one horizontal raster scan interval.

2. The method of claim 1 wherein said sampled-data chrominance values have the same density of sampling in image space as said sampled-data luminance values.

3. The method of claim 1 wherein said sampled-data chrominance values are less densely sampled in image space than said sampled-data luminance values.

4. A method of packing a video random-access memory with a frame or succession of frames of color video data for raster scan display wherein said color video data is stored in luminance and chrominance component form and respective components are organized in separate bit maps, said method comprising the steps of:
   establishing independent start addresses for respective component bits maps;
   describing the luminance values of said frame or succession of frames in digitized sampled-data terms;
   arranging the bits of each of the digitized sampled-data luminance values in a prescribed order;
   stringing the digitized sampled-data luminance values in a prescribed serial order in accordance with a raster scan to generate a luminance bit stream;
   dividing the luminance bit stream into lengths corresponding to integral numbers, including one, of horizontal scan lines of said raster scan, and said lengths being not longer than the number of bits per row of said video random-access memory, for writing into a respective set of rows in said video random-access memory;
   describing first and second sets of chrominance values of said frame or succession of frames in digitized sampled-data terms;
   arranging the bits of each of the digitized sampled-data chrominance values in a prescribed order;
   stringing the digitized sampled-data chrominance values in said first set in prescribed serial order in accordance with a raster scan, to generate a first chrominance bit stream;
   stringing the digitized sampled-data chrominance values in said second set in a prescribed serial order in accordance with a raster scan to generate a second chrominance bit stream; and
   dividing the first and second chrominance bit stream into lengths corresponding to integral numbers, including one, of horizontal scan lines of said raster scan, and said lengths being not longer than the number of bits per row of said video random-access memory, for writing into respective further rows in said video random-access memory;

wherein said set of rows of luminance data forms a first bit map and said further rows of chrominance data forms at least one further bit map, and rows of data from said first bit map and said further bit map being accessible for sampling at a common memory serial output port within one horizontal raster scan interval.

5. The method of claim 4 wherein said sampled-data chrominance values have the same density of sampling in image space as said sampled-data luminance values.

6. The method of claim 4 wherein said sampled-data chrominance values are less densely sampled in image space than said sampled-data luminance values.

7. The method of calim 4 including the step of:
writing successive lengths of said luminance bit stream in a first set of successive rows of said video random-access memory.

8. The method of claim 7 including the steps of:
writing successive lengths of said first chrominance bit stream in a second set of successive rows of said video random-access memory; and
writing successive lengths of said second chrominance bit stream in a third set of successive rows of said video random-access memory, said first and second and third sets of successive rows sharing no row.

9. The method of claim 4 including the step of:
cyclically writing successive lengths of said luminance bit stream, said first chrominance bit stream and said second chrominance bit stream in successive rows of said video random-access memory.

10. A method of packing a video random-access memory of the type having a parallel input/output port and a serial output port, with a frame or succession of frames of color video data for raster scan display, wherein said video data is stored in luminance and chrominance component form and respective components are arranged in separate bit maps, said method comprising the steps of:
establishing independent start addresses for respective component bit maps;
describing the luminance values of said frame or succession of frames in digitized sampled-data terms;
arranging the bits of each of the digitized sampled-data luminance values in a prescribed order;
stringing the digitized sampled-data luminance values in a prescribed serial order in accordance with a raster scan, to generate a luminance bit stream;
dividing the luminance bit stream into lengths correspondng to integral numbers, including one, of horizontal scan lines of said raster scan, and said lengths being not longer than the number of bits per row of said video random-access memory for writing into a respective set of rows in said video random-access memory;
generating first and second sets of chrominance values describing said frame or succession of frames in digitized sampled-data terms, of equal sampling density in image space;
arranging the bits of each of the digitized sampled-data chrominance values in a prescribed order;
arranging said first set of chrominance values in a prescribed serial order in accordance with a raster scan;
arranging said second set of chrominance values in a prescribed serial order in accordance with the same raster scan as said first set of chrominance values;
alternating ones of said first and second sets of chrominance values as so arranged, on a pixel-by-pixel basis, to generate a chrominance bit stream; and
dividing the chrominance bit stream into lengths corresponding to integral numbers, including one, of horizontal scan lines of said raster scan, and said lengths being not longer than the number of bits per row of said video random-access memory, for writing into a respective set of further rows in said video random-access memory;
wherein said set of rows of luminance data forms a first bit map and said set of further rows of chrominance data forms a second bit map, and rows of data from both said first and second bit maps being accessible for sampling at said serial output port within one horizontal raster scan interval.

11. A method of packing a video random-access memory of the type having a parallel input/output port and a serial output port, with a frame or successioin of frames of color video data for raster scan display, wherein said video data is stored in luminance and chrominance component form and respective components are arranged in separate bit maps, said method comprising the steps of:
establishing independent start addresses for respective component bit maps;
describing the luminance values of said frame or succession of frames in digitized sampled-data terms;
arranging the bits of each of the digitized sampled-data luminance values in a prescribed order;
stringing the digitized sampled-data luminance values in a prescribed order in accordance with a raster scan to generate of luminance bit stream;
dividing the luminance bit stream into lengths corresponding to integral numbers, including one, of horizontal scan lines of said raster scan, and said lengths being not longer than the number of bits per row of said video random-access memory for writing into a set of rows in said memory;
generating first and second sets of chrominance values describing said frame or succession of frames in digitized sampled-data terms, of equal sampling density in image space;
arranging the bits of each of the digitized sampled-data chrominance values in a prescribed order;
arranging said first set of chrominance values in a prescribed order in accordance with a raster scan;
arranging said second set of chrominance values in a prescribed order in accordance with raster scan;
alternating ones of said first and second sets of chrominance values as so arranged, on a line-by-line basis, to generate a chrominance bit stream; and
dividing the chrominance bit stream into lengths corresponding to integral numbers, including one, of horizontal scan lines of said raster scan, and said lengths being not longer than the number of bits per row of said video random-access memory, for writing into respective further rows of said video random-access memory;
wherein said set of rows of luminance data forms a first bit map and said set of further rows of chrominance data forms a second bit map, and rows of data from both said first and second bit maps being accessible for sampling at said serial output port within one horizontal raster scan interval.

12. A method of packing a video random-access memory with a frame or succession of frames of color video data wherein said video data includes at least first and second components and said video data is stored in said memory in component form with said components organized in separate bit maps, said method comprising the steps of:

establishing independent start addresses for respective component bit maps;

describing the values of said first component term for said frame or succession of frames in digitized sampled-data;

arranging the bits of each of the digitized first component term sampled-data in a prescribed order;

stringing the digitized first compnent term values in prescribed serial order in accordance with a raster scan, to generate a first component term bit stream;

dividing the first component term bit stream into lengths corresponding to integral numbers, including one, of horizontal scan lines of said raster scan, and said lengths being not longer than the number of bits per row of said video random-access memory, for writing into a first set of respective rows of said video random-access memory;

describing the values of said second component terms for said frame or succession of frames in digitized sampled-data;

arranging the bits of the digitized second component term sampled-data in a prescribed serial order;

stringing the digitized second component term sampled-data in prescribed serial order in accordance with a raster scan, to generate a second component term bit stream; and dividing the second component term bit stream into lengths corresponding to integral numbers, including one, of horizontal scan lines of said raster scan, and said lengths being not longer than the number of bits per row of said video random-access memory, for writing into a second set of respective further rows of said video random-access memory;

wherein said first and second sets of rows are included in said first and second bit maps respectively and exclusively, and rows of data from both said first and second bit maps are accessible for sampling at a common serial output port of said memory within one horizontal raster scan interval.

13. A method of packing a video random-access memory with a frame or succession of frames of color video data having a plurality of component terms, said component terms being respectively stored in separate bit maps in said memory, said method comprising the steps of:

establishing respective starting addresses for said separate bit maps;

describing the values of a first of said component term for said frame or succession of frames in digitized sampled-data;

arranging the bits of each of the digitized first component term sampled-data in a prescribed serial order;

stringing the digitized first component term sampled-data prescribed serial order in accordance with a raster scan order, to generate a first component term bit stream;

dividing the first component term bit stream into lengths corresponding to integral numbers, including one, of horizontal scan lines of said raster scan, and said lengths being not longer than the number of bits per row of said video random-access memory, for writing into respective rows of said video random-access memory;

describing the values of a second of said component terms for said frame or succession of frames in digitized sampled-data;

arranging the bits of each of the digitized second component term sampled-data in a prescribed serial order;

stringing the digitized second component term sampled-data in prescribed serial order in accordance with a raster scan order, to generate a second component term bit stream;

dividing the second component term bit stream into lengths corresponding to integral numbers, including one, of horizontal scan lines of said raster scan, and said lengths being not longer than the number of bits per row of said video random-access memory, for writing into respective rows of said video random-access memory;

describing the values of a third of said component terms for said frame or succession of frames in digitized sampled data;

arranging the bits of each of the digitized third component term sampled-data in a prescribed serial order;

stringing the digitized third component term sampled-data in prescribed serial order in accordance with a raster scan order, to generate a third component term bit stream; and dividing the third component term bit stream into lengths corresponding to integral numbers, including one, of horizontal scan lines of said raster scan, and said lengths being not greater than the number of bits per row of said video random-access memory, for writing respective rows of said video random-access memory.

14. The method of claim 13 wherein said second component term sampled data have the same density of sampling in image space as said first component term sampled data.

15. The method of claim 14 wherein said third component term sampled data have the same density of sampling in image space as said first compnent term sampled data.

16. The method of claim 13 wherein said second component term sample and said third component term sampled data are each less densely sampled in image space than said sampled-data first component term.

17. The method of claim 16 wherein said second component term sampled data and said third component term sampled data have equal sampling densities.

18. The method of claim 13 including the step of:

writing successive lengths of said first component term bit stream in a first set of successive rows of said video random-access memory.

19. The method of claim 18 including the steps of:

writing successive lengths of said second component term bit stream in a second set of successive rows of said video random-access memory; and writing successive lengths of said third component term bit stream in a third set of successive rows of said video random-access memory, said first and second and third sets of successive rows sharing no row.

* * * * *